(12) United States Patent
Wang et al.

(10) Patent No.: US 11,436,964 B1
(45) Date of Patent: Sep. 6, 2022

(54) ELECTRONIC DEVICES HAVING IMAGE TRANSPORT LAYERS AND ELECTRICAL COMPONENTS

(71) Applicant: Apple Inc., Cupertino, CA (US)

(72) Inventors: Ying-Chih Wang, Sunnyvale, CA (US); Michael J. Brown, Campbell, CA (US); Michael B. Wittenberg, San Francisco, CA (US); Paul C. Kelley, San Francisco, CA (US); Rasamy Phouthavong, San Jose, CA (US); Tyler R. Kakuda, San Francisco, CA (US); Jean-Pierre S. Guillou, Los Gatos, CA (US); Marwan Rammah, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/225,520

(22) Filed: Apr. 8, 2021

Related U.S. Application Data

(63) Continuation of application No. 16/682,406, filed on Nov. 13, 2019, now abandoned.

(60) Provisional application No. 62/760,656, filed on Nov. 13, 2018.

(51) Int. Cl.
*G09G 3/20* (2006.01)
*F21V 8/00* (2006.01)
*G02B 6/12* (2006.01)
*G09F 9/30* (2006.01)

(52) U.S. Cl.
CPC ............ *G09G 3/20* (2013.01); *G02B 6/0006* (2013.01); *G02B 6/0008* (2013.01); *G02B 2006/12111* (2013.01); *G09F 9/301* (2013.01)

(58) Field of Classification Search
None
See application file for complete search history.

(56) References Cited

U.S. PATENT DOCUMENTS

| | | | |
|---|---|---|---|
| 4,349,817 | A | 9/1982 | Hoffman et al. |
| 4,534,813 | A | 8/1985 | Williamson et al. |
| 5,329,386 | A | 7/1994 | Birecki et al. |
| 5,502,457 | A | 3/1996 | Sakai et al. |
| 5,659,378 | A | 8/1997 | Gessel |
| 6,046,730 | A | 4/2000 | Bowen et al. |
| 6,407,785 | B1 | 6/2002 | Yamazaki |

(Continued)

FOREIGN PATENT DOCUMENTS

KR 20180034832 A 4/2018

*Primary Examiner* — Christopher J Kohlman
(74) *Attorney, Agent, or Firm* — Treyz Law Group, P.C.; G. Victor Treyz; David K. Cole

(57) ABSTRACT

An electronic device may have a display with pixels configured to display an image. The pixels may be overlapped by a cover layer. The display may have peripheral edges with curved cross-sectional profiles. An inactive area in the display may be formed along a peripheral edge of the display or may be surrounded by the pixels. Electrical components such as optical components may be located in the inactive area. An image transport layer may be formed from a coherent fiber bundle or Anderson localization material. The image transport layer may overlap the pixels, may have an opening that overlaps portions of the inactive area, may have an output surface that overlap portions of the inactive area, and/or may convey light associated with optical components in the electronic device.

40 Claims, 22 Drawing Sheets

(56) References Cited

U.S. PATENT DOCUMENTS

| | | |
|---|---|---|
| 6,467,922 B1 | 10/2002 | Blanc et al. |
| 6,680,761 B1 | 1/2004 | Greene et al. |
| 6,845,190 B1 | 1/2005 | Smithwick et al. |
| 7,228,051 B2 | 6/2007 | Cok et al. |
| 7,542,209 B2 | 6/2009 | McGuire, Jr. |
| 7,823,309 B2 | 11/2010 | Albenda |
| 7,856,161 B2 | 12/2010 | Tabor |
| 8,045,270 B2 | 10/2011 | Shin et al. |
| 8,723,824 B2 | 5/2014 | Myers et al. |
| 8,824,779 B1 | 9/2014 | Smyth |
| 8,976,324 B2 | 3/2015 | Yang et al. |
| 9,268,068 B2 | 2/2016 | Lee |
| 9,312,517 B2 | 4/2016 | Drzaic et al. |
| 9,342,105 B2 | 5/2016 | Choi et al. |
| 9,509,939 B2 | 11/2016 | Henion et al. |
| 9,591,765 B2 | 3/2017 | Kim et al. |
| 9,755,004 B2 | 9/2017 | Shieh et al. |
| 9,818,725 B2 | 11/2017 | Bower et al. |
| 9,907,193 B2 | 2/2018 | Lee et al. |
| 10,048,532 B2 | 8/2018 | Powell et al. |
| 10,052,831 B2 | 8/2018 | Welker et al. |
| 2006/0016448 A1 | 1/2006 | Ho |
| 2007/0052614 A1 | 3/2007 | Zimmerman |
| 2007/0097108 A1* | 5/2007 | Brewer ................ G06F 1/1615 345/204 |
| 2008/0144174 A1 | 6/2008 | Lucente et al. |
| 2008/0186252 A1 | 8/2008 | Li |
| 2009/0322794 A1 | 12/2009 | Lowe et al. |
| 2010/0177261 A1 | 7/2010 | Jin et al. |
| 2010/0238090 A1 | 9/2010 | Pomerantz et al. |
| 2011/0025594 A1 | 2/2011 | Watanabe |
| 2011/0057861 A1 | 3/2011 | Cok et al. |
| 2011/0102300 A1 | 5/2011 | Wood et al. |
| 2011/0242686 A1 | 10/2011 | Watanabe |
| 2012/0026592 A1* | 2/2012 | Reininger ............ G02B 13/06 359/619 |
| 2012/0218219 A1 | 8/2012 | Rappoport et al. |
| 2013/0081756 A1 | 4/2013 | Franklin et al. |
| 2013/0083080 A1 | 4/2013 | Rappoport et al. |
| 2013/0235560 A1 | 9/2013 | Etienne et al. |
| 2013/0279088 A1 | 10/2013 | Raff et al. |
| 2014/0016071 A1* | 1/2014 | Yang ..................... G02B 6/06 349/106 |
| 2014/0037257 A1* | 2/2014 | Yang ..................... G02B 6/08 385/116 |
| 2014/0092028 A1 | 4/2014 | Prest et al. |
| 2014/0092346 A1 | 4/2014 | Yang et al. |
| 2014/0183473 A1 | 7/2014 | Lee et al. |
| 2014/0240985 A1 | 8/2014 | Kim et al. |
| 2014/0328041 A1 | 11/2014 | Rothkopf et al. |
| 2014/0354920 A1 | 12/2014 | Jang et al. |
| 2015/0093087 A1 | 4/2015 | Wu |
| 2015/0227227 A1 | 8/2015 | Myers et al. |
| 2016/0231784 A1 | 8/2016 | Yu et al. |
| 2016/0234362 A1 | 8/2016 | Moon et al. |
| 2017/0235341 A1 | 8/2017 | Huitema et al. |
| 2018/0052312 A1 | 2/2018 | Jia et al. |
| 2018/0088416 A1 | 3/2018 | Jiang et al. |
| 2018/0128973 A1* | 5/2018 | Powell ............... H01L 51/5275 |
| 2018/0356591 A1* | 12/2018 | Karafin ............... G02B 30/34 |
| 2018/0372958 A1 | 12/2018 | Karafin et al. |

\* cited by examiner

ELECTRONIC DEVICES HAVING IMAGE TRANSPORT LAYERS AND ELECTRICAL COMPONENTS

This application is a continuation of U.S. patent application Ser. No. 16/682,406, filed Nov. 13, 2019, which claims the benefit of provisional patent application No. 62/760,656, filed Nov. 13, 2018, which are hereby incorporated by reference herein in their entireties.

FIELD

This relates generally to electronic devices, and, more particularly, to incorporating components into electronic devices.

BACKGROUND

Electronic devices such as cellular telephones, tablet computers, and other electronic equipment may include electronic components. The electronic components may include components that emit and detect light. For example, the electronic components may include displays and optical components.

If care is not taken, electronic devices with displays, optical components, and other electrical components may not have a desired appearance or may be difficult to use satisfactorily. For example, displays and optical components may be bulky and unattractive or may not exhibit desired performance.

SUMMARY

An electronic device may have a display and electrical components. The electrical components may include optical components such as image sensors, light sensors, light-emitting devices, and other optical devices. The electronic device may have a housing and a display coupled to the housing. The display has pixels that display an image.

An image transport layer may overlap the display. The image transport layer may be formed from a coherent fiber bundle or Anderson localization material. The image transport layer may have an input surface that receives an image such as the image presented on the pixels of the display. The image transport layer may transport the image that is provided to the input surface to a corresponding output surface. The output surface may have planar portions and/or may have portions with curved cross-sectional profiles.

The display may have an inactive area along a peripheral edge of the display and/or may have an inactive area that is surrounded by the pixels. Electrical components such as audio components and optical components may be mounted in the inactive area. The optical components may transmit and/or receive light through a portion of the image transport layer that overlaps the optical components and/or may transmit and/or receive light through an opening in the image transport layer that is aligned with the inactive area.

DETAILED DESCRIPTION

Electronic devices may be provided with electrical components. The electrical components may include optical components that emit and/or detect light. The optical components may include light-emitting components such as displays, status indicator lights, optical sensors that emit light such as proximity sensors, camera flashes, flood illuminators for infrared cameras, and other light-emitting devices. The optical components may also include light-receiving components such as photodetectors, image sensors, ambient light sensors, and other optical sensors that receive light.

To help enhance device aesthetics and/or to help enhance optical component performance, the electronic devices may include structures that transport light from an input surface to an output surface through coherent fiber bundle or a layer of Anderson localization material. Structures such as these may sometimes be referred to as image transport layers, image transport structures, image transport layer structures, etc.

As an example, an electronic device may have a display on which an image is displayed. An image transport layer may overlap the display so that an input surface of the image transport layer is adjacent to the display and receives the image from the display. The image transport layer transports the image from the input surface to a corresponding output surface of the image transport layer. The output surface faces outwardly from the device so that the image on the output surface may be viewed by a user of the electronic device. If desired, the output surface may have a curved cross-sectional profile.

As another example, an optical sensor may be overlapped by an image transport layer. The input surface of the image transport layer may face outwardly to receive light from an exterior region surrounding the electronic device. The output surface of the image transport layer may be adjacent to a sensor. During operation, light for the optical sensor may pass through the image transport layer from the exterior region to the optical sensor.

Figure 1:
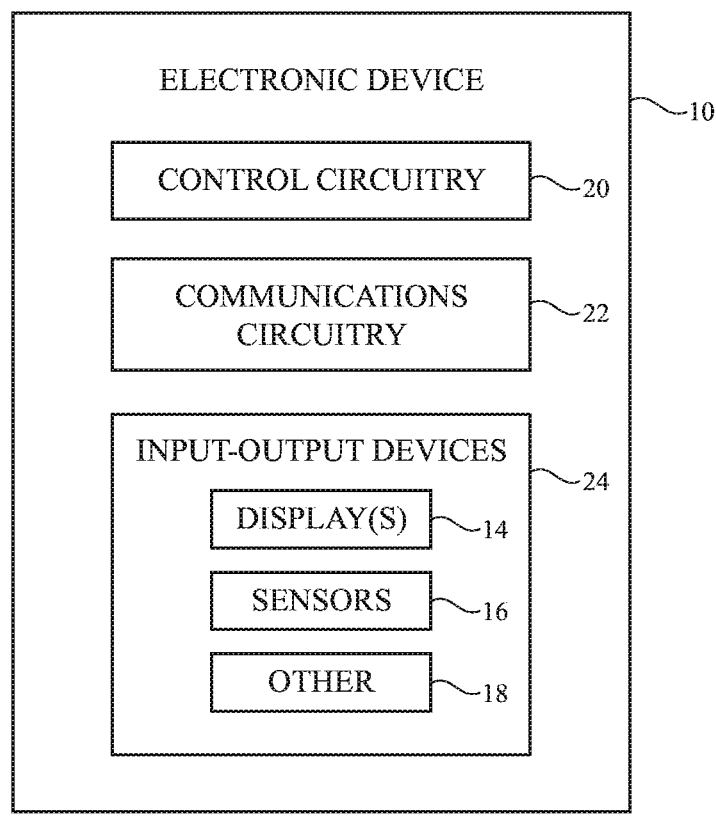
FIG. 1 is a schematic diagram of an illustrative electronic device in accordance with an embodiment.

A schematic diagram of an illustrative electronic device having an image transport layer is shown in FIG. 1. Device 10 may be a cellular telephone, tablet computer, laptop computer, wristwatch device or other wearable device, a television, a stand-alone computer display or other monitor, a computer display with an embedded computer (e.g., a desktop computer), a system embedded in a vehicle, kiosk, or other embedded electronic device, a media player, or other electronic equipment.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link) Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Display 14 may have an array of pixels configured to display images for a user. The display pixels may be formed on one or more substrates such as one or more flexible substrates (e.g., display 14 may be formed from a flexible display panel). Conductive electrodes for a capacitive touch sensor in display 14 and/or an array of indium tin oxide electrodes or other transparent conductive electrodes overlapping display 14 may be used to form a two-dimensional capacitive touch sensor for display 14 (e.g., display 14 may be a touch sensitive display).

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 2:
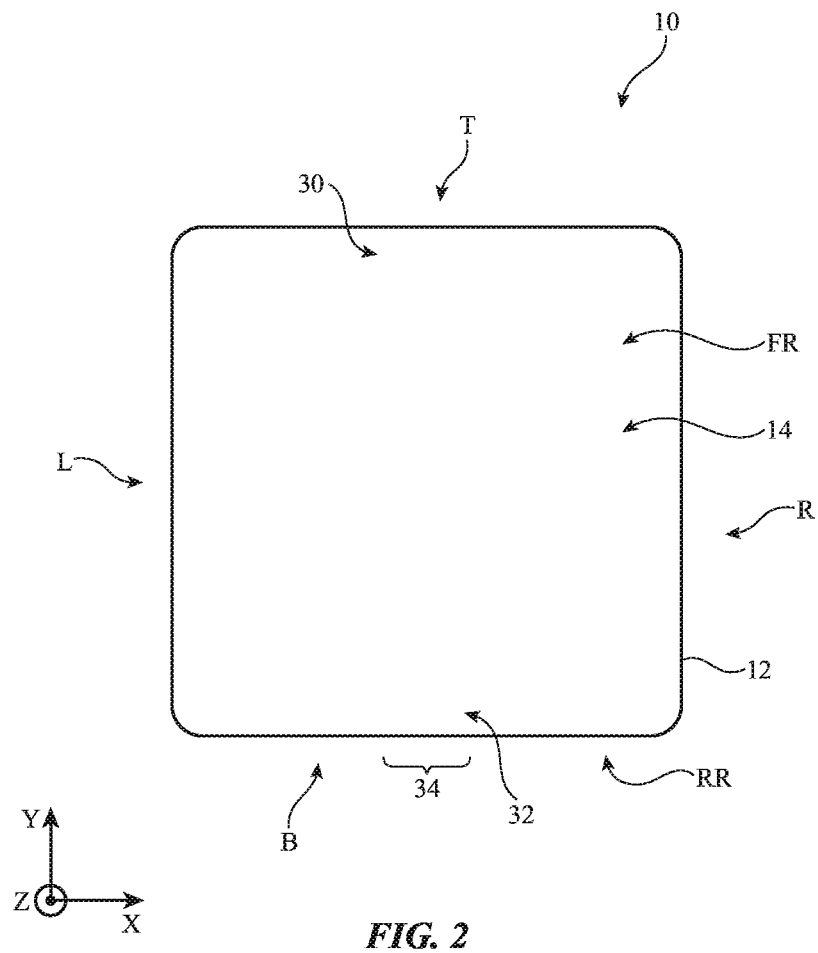
FIG. 2 is a top view of an illustrative electronic device in accordance with an embodiment.

FIG. 2 is a front (plan) view of electronic device 10 in an illustrative configuration in which display 14 covers some or all of the front face FR of device 10. Opposing rear face RR of device 10 may be covered by a housing wall formed from glass, metal, polymer, and/or other materials. Rear face RR may be free of display pixels and/or may be partly or fully covered by display 14.

Device 10 may include a housing (e.g., housing 12) that forms sidewall structures for device 10 and/or internal supporting structures (e.g., a frame, midplate member, etc.). Glass structures, transparent polymer structures, image transport layer structures, and/or other transparent structures that cover display 14 and other portions of device 10 may provide structural support for device 10 and may sometimes be referred to as housing structures. For example, a glass or polymer layer that covers and protects a pixel array in display 14 may serve as a display cover layer while also serving as a housing structure for device 10.

In some illustrative arrangements, sidewall portions of device 10 may be covered with portions of display 14. In the example of FIG. 2, device 10 is characterized by four peripheral edges: upper edge T, lower edge B, left edge L, and right edge R. Upper edge T and opposing lower edge B may run parallel to each other and parallel to the X axis of FIG. 2. Left edge L and opposing right edge R may run parallel to each other and parallel to the Y axis of FIG. 2. Front face FR and rear face RR may be planar (e.g., two parallel planes offset by a distance along the Z axis) and/or may include curved portions.

Touch sensor circuitry such as two-dimensional capacitive touch sensor circuitry may be incorporated into one or more displays in device 10 as separate touch sensor panels overlapping display pixels or as part of one or more display panels in device 10. Touch sensors may be formed on front face FR, rear face RR, and/or edges (sidewall faces) T, B, R, and/or L. If desired, icons and other images for virtual buttons may be displayed by the pixels of device. For example, virtual buttons and/or other images may be displayed on front face FR, rear face RR, and/or edges T, B, R, and/or L and may overlap touch sensor circuitry. Haptic output devices may be used to provide haptic feedback when virtual buttons are selected (as an example).

Device 10 of FIG. 2 has a rectangular outline (rectangular periphery) with four rounded corners. If desired, device 10 may have other shapes. For example, device 10 may have a shape that folds and unfolds along a bend (folding) axis and may include a display that overlaps or that does not overlap the bend axis, may have a shape with an oval footprint or circular outline, may have a cubic shape, may have a pyramidal, cylindrical, spherical, or conical shape, or may have other suitable shapes. The configuration of FIG. 2 is illustrative.

If desired, openings may be formed in the surfaces of device 10. For example, a speaker port and optical windows for an ambient light sensor, an infrared proximity sensor, and a depth sensor may be formed in a region such as upper region 30 of front face FR. A fingerprint sensor, touch sensor button, force-sensitive button, or other sensor that operates through display 14 may be formed under the portion of display in lower region 32 on front face FR and/or other portions of front face FR and/or other external surfaces of device 10. Device 10 may be free of connector openings or an opening for a connector (e.g., a digital data connector, analog signal connector, and/or power connector) may be formed in portion 34 of the lower sidewall of device 10 running along lower edge B or elsewhere in device 10. Openings may be omitted when power is received wirelessly or is received through contacts that are flush with the surface of device 10 and/or when data is transferred and received wirelessly using wireless communications circuitry in circuitry 22 or through contacts that are flush with the exterior surface of device 10.

Figure 3:
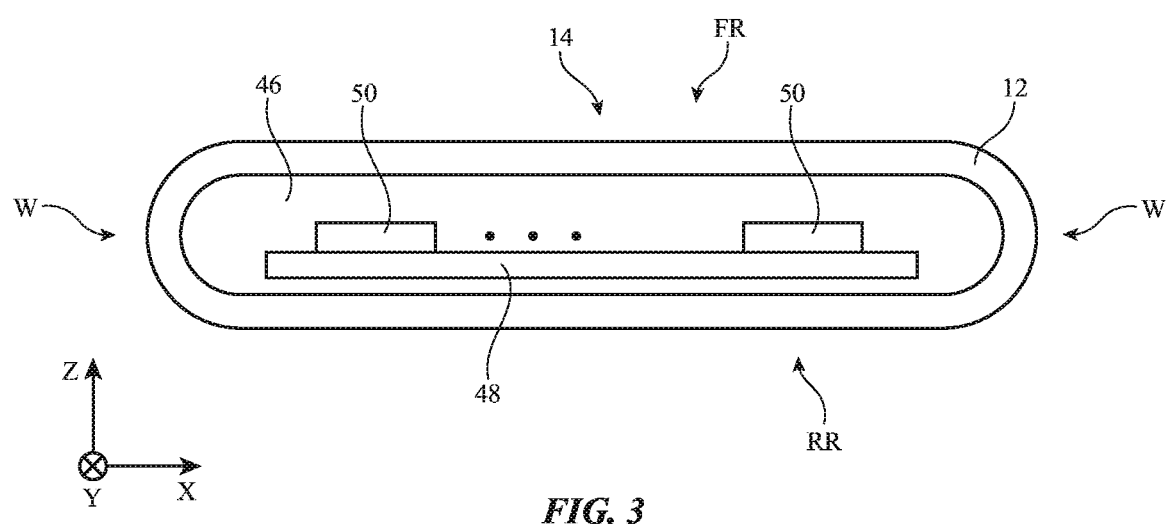
FIG. 3 is a cross-sectional side view of an illustrative electronic device in accordance with an embodiment.

FIG. 3 is a cross-sectional side view of an illustrative electronic device. As shown in FIG. 3, device 10 may have a housing such as housing 12. Housing 12 may include structures formed from glass, polymer, metal, wood, sapphire or other crystalline material, ceramic, fabric, other materials, and/or combinations of these materials. In some configurations, transparent portions of housing 12 may be configured to form display cover layers that overlap one or more displays or other light-emitting optical components. In the example of FIG. 3, display 14 is formed on front face FR of device 10. Display 14 includes an array of pixels. During operation, the pixels are used to display an image for viewing by a user of device 10. Arrays of pixels for displays in device 10 may sometimes be referred to as pixel layers, pixel array layers, displays, display structures, display layers, or display panels. In general, displays and other optical components may be located on front face FR, rear face RR, and/or sidewalls W of device 10 (e.g., sidewalls on edges T, B, R, and/or L). Housing 12 may have planar portions (e.g., in central portions of front face FR and rear face RR and/or on sidewalls W of device 10) and/or curved portions (e.g., curved edges, curved corners, portions of front face FR and/or rear face RR that have curved cross-sectional profiles, etc.).

As shown in FIG. 3, device 10 may include electrical components 50 in interior 46 (e.g., integrated circuits, sensors and other input-output devices, control circuitry, display layers such as organic light-emitting diode panels or other display layers, etc.). Electrical components 50 may, if desired, be mounted on printed circuits such as printed circuit 48 (e.g., flexible printed circuits and/or printed circuits formed from rigid printed circuit board material). In some configurations, a display may be formed on rear face RR. In other configurations, no display is present on rear face RR. In configurations in which no display is present on rear face RR, the portion of housing 12 on rear face RR may be formed from metal (e.g., a stainless steel or aluminum layer). For example, device 10 may have a rear housing wall formed from metal and may have optional sidewalls that extend upwardly from the rear housing wall. If desired, device 10 may have a rear housing wall and/or other housing walls formed from opaque glass, transparent glass coated with opaque materials such as ink or metal, and/or other housing wall materials.

In some configurations for device 10, an opaque material such as metal or opaque polymer may form some or all of sidewalls W of device 10. As an example, metal that forms some or all of a rear housing wall on rear face RR of device 10 may protrude upwardly along the edges of device 10 to form some or all of the sidewalls for device 10. As another example, a peripheral metal band that forms some or all of the sidewalls of device 10 may extend around the rectangular periphery of device 10 (e.g., along upper edge T, right edge R, lower edge B, and left edge L). Sidewalls may have vertically extending planar surfaces and/or may exhibit other surface profiles (e.g., curved profiles).

If desired, some or all of the sidewalls of device 10 may be formed from clear material and may overlap light-producing components. This material may, as an example, be part of a display cover layer (e.g., a sidewall may be formed from an extension of a central display cover layer portion and may be formed from glass, polymer, crystalline material, etc.). Because clear layers of glass, plastic, crystalline material, and/or other clear layers of material in device 10 may enclose and protect internal device components, these outer layers of material in device 10 may serve as portions of housing 12 for device 10.

In configurations for device 10 in which sidewalls have transparent portions formed from extending portions of a display cover layer or other transparent material, the sidewalls may overlap light-emitting components. Transparent sidewalls may have planar and/or curved surfaces and may be formed from clear glass, clear polymer, transparent crystalline material such as sapphire, and/or other transparent protective material. Displays (pixel arrays), light-emitting diodes covered with diffusing material, light-emitting diodes covered with patterned masks (e.g., opaque coatings with icon-shaped openings or openings of other shapes), and/or other light-emitting devices may be placed under clear sidewalls.

Figure 4:
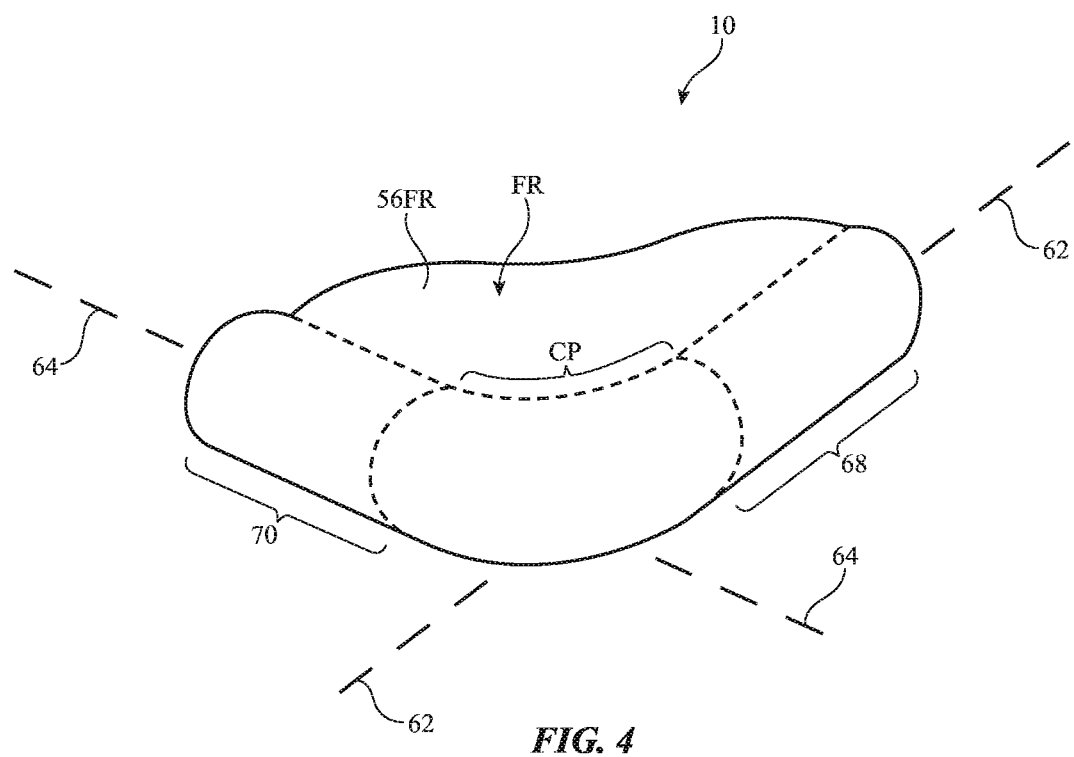
FIG. 4 is a perspective view of an illustrative corner of an electronic device in accordance with an embodiment.

If desired, device 10 may have external surfaces with compound curvature. A perspective view of an illustrative corner portion of device 10 is shown in FIG. 4. In the example of FIG. 4, device 10 has edge portions 68 and 70 formed from sidewalls W (FIG. 3). Edge portions 68 and 70 may have surfaces that curve about axes 62 and 64, respectively. These portions of housing 12 extend along the straight sides of device 10 and are characterized by curved surfaces that can be flattened into a plane without distortion (sometimes referred to as developable surfaces). At the corner of device 10 of FIG. 4, device 10 has curved surface portions CP with compound curvature (e.g., a surface that can only be flattened into a plane with distortion, sometimes referred to as a surface with Gaussian curvature). Each of the four corners of device 10 may have this arrangement, if desired.

Flexible displays such as organic light-emitting diode displays with flexible polyimide substrates or other bendable polymer substrates can be bent about axes such as axes 62 and 64 to form curved surfaces in portions 68 and 70 (e.g., these substrates may be bent without wrinkling or other undesired deformation). In compound curvature regions such as corner regions of device 10, display 14 can be formed from materials that stretch (e.g., displays formed from mesh-shaped elastomeric substrate material), may be formed from flexible displays that are patterned to create one or more flexible strips and/or other structures that can be bent to cover at least part of the compound curvature regions, may be formed from bent tab portions that are part of a display (display substrate) that also is overlapped by a display cover layer on front face FR and/or other portions of device 10, may be formed using pixels on one or more display substrates that are separate from a main central display substrate, and/or may be formed from other display structures.

To help accommodate optical components within housing 12, device 10 (e.g., housing 12) may include one or more image transport layer structures (e.g., coherent fiber bundles or Anderson localization material). The image transport layer structures may transport light (e.g., image light and/or other light) from one surface to another while preventing the light from spreading laterally and thereby preserving the integrity of the image light or other light. This allows an image produced by an array of pixels in a flat or curved display to be transferred from an input surface of a first shape at a first location to an output surface with compound curvature or other desired second shape at a second location. The image transport layer may therefore move the location of an image and may optionally change the shape of the surface on which the image is presented. In scenarios in which the image transport layer structure is adjacent to a light-detecting component, light to be detected, such as light from the environment surrounding device 10, may be conveyed to the light-detecting component through the image transport layer structure. The detected light may be image light, ambient light to be detected by an ambient light sensor, reflected light being measured by a proximity sensor light detector, and/or other light received and detected by an image sensor, photodetector, and/or other light detecting component.

Figure 5:
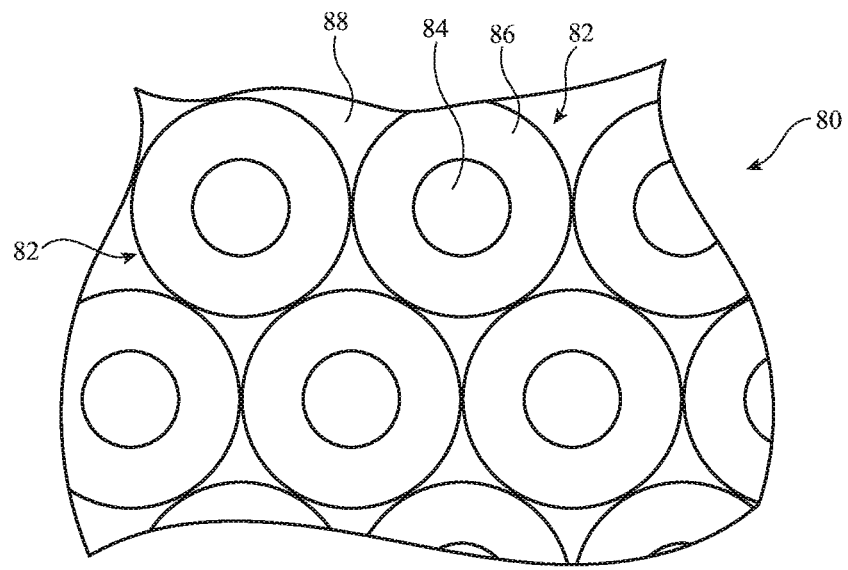
FIG. 5 is a cross-sectional side view of an illustrative image transport layer in accordance with an embodiment.

Fiber bundles include fiber cores of a first refractive index surrounded by cladding (e.g., polymer) of a second, lower refractive index. In some configurations, additional polymer, which may sometimes be referred to as binder or secondary cladding, may be included. A cross-sectional view of an illustrative image transport layer formed from a fiber bundle is shown in FIG. 5. In the example of FIG. 5, image transport layer 80 is formed from a bundle of fibers 82. Fibers 82 may have respective fiber cores 84. Cores 84 may be surrounded by material with a different index of refraction than cores 84. For example, each core 84 may have a first index of refraction and the material surrounding that core may have a second index of refraction that is lower than the first index of refraction by an index difference of at least 0.05, at least 0.1, at least 0.15, at least 10%, at least 20%, less than 50%, less than 30%, or other suitable amount. When the material surrounding cores 84 has a refractive index that is lower than cores 84, light may be guided within cores 84 in accordance with the principal of total internal reflection.

In the example of FIG. 5, cores 84, which may be formed from transparent material such as glass or polymer, are surrounded by lower index structures such as claddings 86 (e.g., glass or polymer of lower refractive index). Additional material (e.g., optional binder 88) may be included in image transport layer 80 (e.g., to hold fibers 82 in place, etc.). Binder 88 may be formed from a material (e.g., polymer or glass) with a refractive index lower than that of cores 84 and/or lower than that of cladding 86 to promote total internal reflection in cores 84. In some configurations, cores 84 may be coated with metal and/or surrounded by air or other material to help confine light within cores 84. Arrangements in which some of cores 84, some of cladding 86, and/or some of binder 82 are formed from materials such as opaque material, colored transparent material, infrared-light-blocking-and-visible-light-transmitting material, infrared-light-transmitting-and-visible-light-blocking material, and/or other materials may also be used. For example, some of these structures may be formed from a black polymer or other light-absorbing material to help absorb stray light (e.g., light that is not being guided within cores 84). If desired, polymer 88 may be omitted (e.g. in arrangements in which cladding 86 is used to hold fibers 82 together in image transport layer 80).

The diameters of cores 84 may be, for example, at least 5 microns, at least 7 microns, at least 8 microns, at least 9 microns, less than 40 microns, less than 17 microns, less than 14 microns, less than 11 microns, or other suitable diameter. Fibers 82 may have diameters of at least 6 microns, at least 7 microns, at least 8 microns, at least 9 microns, less than 50 microns, less than 17 microns, less than 14 microns, less than 11 microns, or other suitable diameter.

Figure 6:
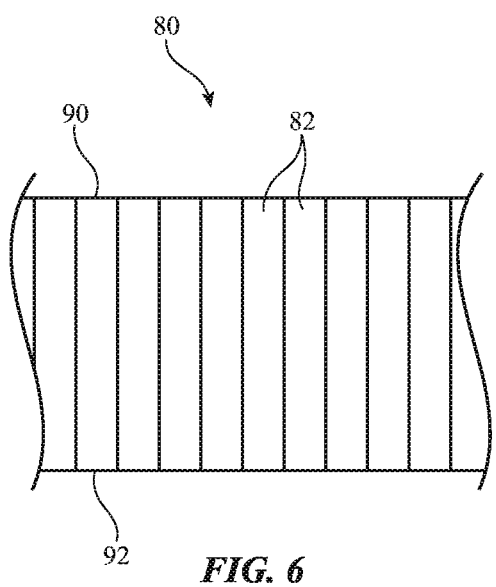
FIG. 6 is a cross-sectional side view of an illustrative image transport layer in accordance with an embodiment.

As shown in FIG. 6, fibers 82 may extend parallel to each other in image transport layer 80 (e.g., the fibers may run next to each other along the direction of light propagation through the fiber bundle). This allows image light or other light that is presented at input surface 90 to be conveyed to output surface 92. In the example of FIG. 6, surfaces 90 and 92 are planar and fibers 82 extend in straight lines between surfaces 90 and 92. Other arrangements such as arrangements in which fibers 82 are bent and/or taper and/or in which surface 90 and/or surface 92 have curved cross-sectional profiles may also be used.

In general, image transport layers such as image transport layer 80 of FIG. 6 and the other FIGS. may be formed from a coherent fiber bundle (see, e.g., FIG. 5) or may be formed from Anderson localization material instead of a coherent fiber bundle. Anderson localization material is characterized by transversely random refractive index features (higher index regions and lower index regions) of about two wavelengths in lateral size that are configured to exhibit two-dimensional transverse Anderson localization of light (e.g., the light output from the display of device 10). These refractive index variations are longitudinally invariant (e.g., along the direction of light propagation, perpendicular to the surface normal of a layer of Anderson localization material). Configurations in which image transport layer 80 has a bundle of fibers 82 are sometimes described herein as an example.

Fiber bundles and Anderson localization material can be used to form plates (e.g., layers with a thickness of at least 0.2 mm, at least 0.5 m, at least 1 mm, at least 2 mm, at least 5 mm, less than 20 mm, or other suitable thickness) and/or other image transport structures (e.g., straight and/or bent elongated light pipes, spherical shapes, cones, tapered shapes, etc.). As described in connection with FIG. 6, the surfaces of image transport structures may be planar and/or may have curved profiles.

Image transport layers can be used to transport an image from a first surface (e.g., the surface of a pixel array) to a second surface (e.g., a surface in device 10 with compound curvature or other curved and/or planar surface shape) without causing the image light to spread laterally. For example, an image that is produced by a display can be transported 5 mm vertically through an image transport layer that is 5 mm thick and can then be viewed on the output surface of the image transport layer. As another example, an image transport layer may have a planar input surface and an output surface with a planar central region surrounded by curved edges and corners of compound curvature. With this type of arrangement, images produced by a display that rests against the planar input surface can be smoothly transported to an output surface without becoming blurred, even if the output surface contains curved portions such as areas of compound curvature. Curved image transport layer surfaces can be formed by polishing, slumping heated fiber bundle material, molding under heat and/or pressure, etc. In devices with optical sensors, light can be transported through an image transport structure to an optical sensor.

In portions of device 10 that have an externally viewable display, a display cover layer that forms at least part of housing 12 may be used to cover and protect image transport layer 80 or an image transport layer that is uncovered by a separate display cover layer may be used in forming at least part of housing 12.

In arrangements in which a display cover layer is used to cover and project layer 80, adhesive, touch sensor structures, diffuser layers, masking layers, filter layers, antireflection layers, and/or other structures may optionally be interposed between layer 80 and the display cover layer. The display cover layer may be formed from glass, polymer, ceramic, crystalline material such as sapphire, multiple layers of these materials and/or other materials and may have optional coatings (e.g., an antireflection layer, an antiscratch layer, an antismudge layer, etc.). The display cover layer may form some or all of housing 12 of FIG. 3. A display layer with an array of pixels that displays an image may be located within the interior of housing 12. Image transport layer 80 may be interposed between the array of pixels and the display cover layer so that the image on the pixel array is transported from the input surface of the image transport layer to the output surface of the image transport layer. The image on the output surface of the image transport layer is visible through the display cover layer forming the portion of housing 12 that overlaps the image transport layer.

In arrangements in which no display cover layer is present, one or more portions of housing 12 of FIG. 3 may be formed from an image transport layer that is not covered with a separate protective member. For example, an image transport layer with a planar central portion, curved peripheral edges, and corners of compound curvature may be used to form an upper portion and sidewall portion of housing 12. In this type of configuration, the outside of image transport layer 80 is not covered with a separate display cover layer member so that output surface 92 forms the outermost surface of housing 12 of FIG. 3. The pixel array may be formed against input surface 90 of the image transport layer, which may form the innermost surface of housing 12 of FIG. 3.

During use, output surface 92 may contact external objects. To prevent damage to image transport layer 80 (e.g., the portion of housing 12 of FIG. 3 that overlaps the pixel array), output surface 92 may be strengthened using a chemical strengthening process or other strengthening process. For example, in a scenario in which layer 80 is formed from glass, surface 92 of layer 80 may be strengthened using an ion exchange chemical strengthening treatment and/or other strengthening processes (e.g., heat treatment, etc.). Chemical strengthening may be performed by placing a glass image transport layer in a heated potassium salt bath to perform an ion-exchange process. Chemical strengthening in this way may enhance the compressive stress of the outermost surfaces of the glass image transport layer relative to deeper portions. Heat treatment (e.g., thermal tempering) may also be used to create compressive stress on outer surfaces of image transport layer 80. By creating compressive stress on the surface of image transport layer 80, the strength of output surface 92 may be enhanced. If desired, an antiscratch coating, an antireflection coating, an antismudge coating, and/or other exterior coating layers may be applied to surface 92. When layer 80 is strengthened at output surface 92, layer 80 is able to withstand damage during drop events and other events that impose stress on layer 80.

Illustrative image transport layers 80 are shown in FIGS. 7, 8, 9, 10, and 11. Structures such as these may have lower surfaces that serve as input surfaces (e.g., to receive image light from a display) and opposing upper surfaces (e.g., surfaces with curved edges aligned with the periphery of device 10). For example, structures such as these may be provided on front surface FR so that the curved edges of these structures run around the periphery of device 10 while the planar portions of these structures overlap the center of display 14 on front surface FR (as an example).

Figure 7:
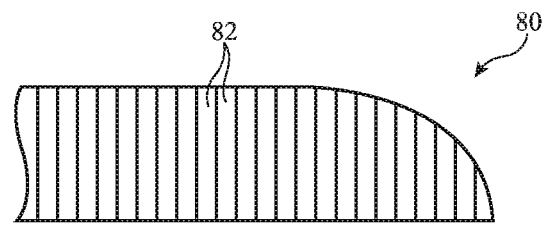
FIGS. 7, 8, 9, 10, and 11 are cross-sectional side views of illustrative image transport layers in accordance with embodiments.

As shown in the example of FIG. 7, fibers 82 may be oriented to extend vertically through image transport layer 80.

Figure 8:
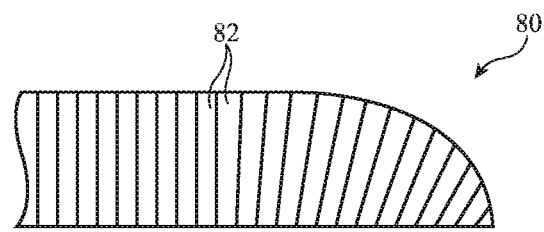

FIG. 8 shows how fibers 82 may be tilted by progressively increasing amounts at increasing distances toward the curved outer peripheral edge of image transport layer 80.

Figure 9:
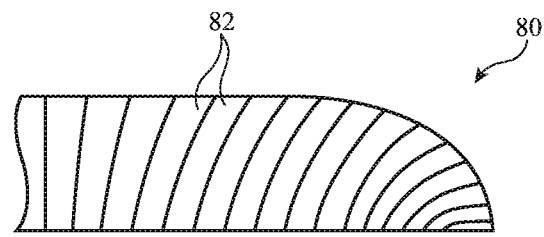

In the example of FIG. 9, fibers 82 are both tilted and curved.

Figure 10:
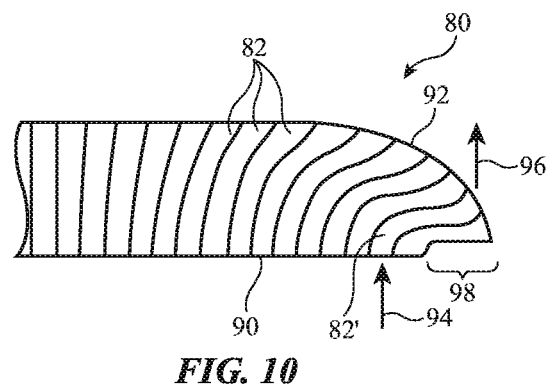

FIG. 10 shows how fibers 82 may contain multiple bends along their lengths. This allows the entrances and exit portions of the fibers to be oriented along the desired direction of light propagation. As an example, fiber 82' may have an entrance portion with a longitudinal axis that is aligned parallel or nearly parallel to light entrance direction 94 so that light from a display or other optical component may be emitted efficiently into fiber 82 in direction 94. Fiber 82' may also have an exit portion with a longitudinal axis that is aligned parallel or nearly parallel to light emission direction 96 (e.g., a direction facing a viewer) so that light emitted from the curved edge portion of image transport layer will be directed toward the viewer rather than being angled away from the viewer. If desired, the entrance and output faces of each fiber may be oriented to facilitate light output in desired directions. Optional grooves and other structures may also be formed in image transport layer 80 (see, e.g., illustrative peripheral groove 98). This may facilitate the coupling of layer 80 to a housing structure and/or may otherwise facilitate the mounting of image transport layer 80 within device 10 (as an example).

Figure 11:
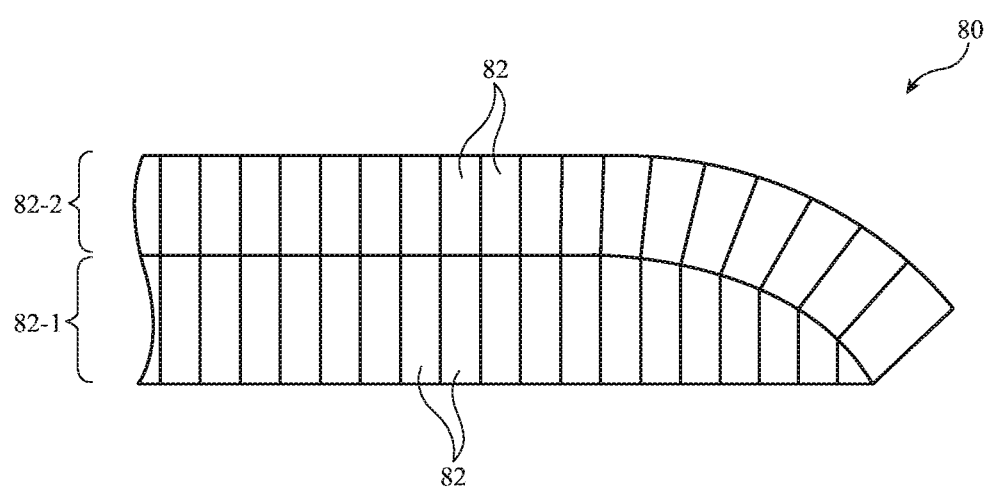

In the illustrative configuration of FIG. 11, image transport layer 80 has multiple overlapped portions such as lower portion 80-1 and upper portion 80-2. Portions 80-1 and 80-2 may be plates or other layers that have fibers 82 with different orientations. As an example, portion 80-1 may have vertically oriented fibers 82 and portion 80-2 may have tilted fibers that are oriented at a non-zero angle with respect to fibers 82 in portion 80-1. Fibers 82 in different portions of layer 80 may, if desired, be aligned end-to-end. Arrangements in which fibers 82 in different portions of layer 80 are not aligned may also be used. If desired, image transport layer 80 may have three or more overlapped layers of fibers with potentially different orientations and/or shapes. Each sublayer of fibers 82 in layer 80 may have input and/or output surfaces that are planar and/or that are curved. The configuration of FIG. 11 is merely illustrative.

Device 10 may include one or more protective structures formed from clear portions of housing 12. As an example, housing 12 of device 10 may have a clear portion such as portion 12-1 of FIG. 12 that overlaps image transport layer 80 and display layer 100. Housing 12 may also have a portion such as portion 12-2 (e.g., a metal housing wall, a transparent housing wall such as a glass housing wall with an inner surface covered with an opaque masking material such as ink, metal, and/or other coating materials, and/or other housing wall materials).

Portion 12-1 may form a display cover layer that covers a display layer such as display layer 100. Display layer 100 may have an active area such as active area 104 with an array of pixels 102 that display an image for a viewer such as viewer 108 who is viewing device 10 in direction 110. Display layer 100 may also have an inactive area such as inactive border area 106 that contains metal signal paths, display driver circuitry, encapsulation structures, and other structures that do not emit light. Inactive border area 106 of display layer 100 is free of pixels and therefore does not display any part of the image that is displayed by display layer 100. In some configurations, portion 12-1 may be omitted, so that image transport layer 80 forms housing 12 over display layer 100 and so that output surface 92 forms the outermost portion of housing 12 above display layer 100. The arrangement of FIG. 12 is illustrative.

Figure 12:
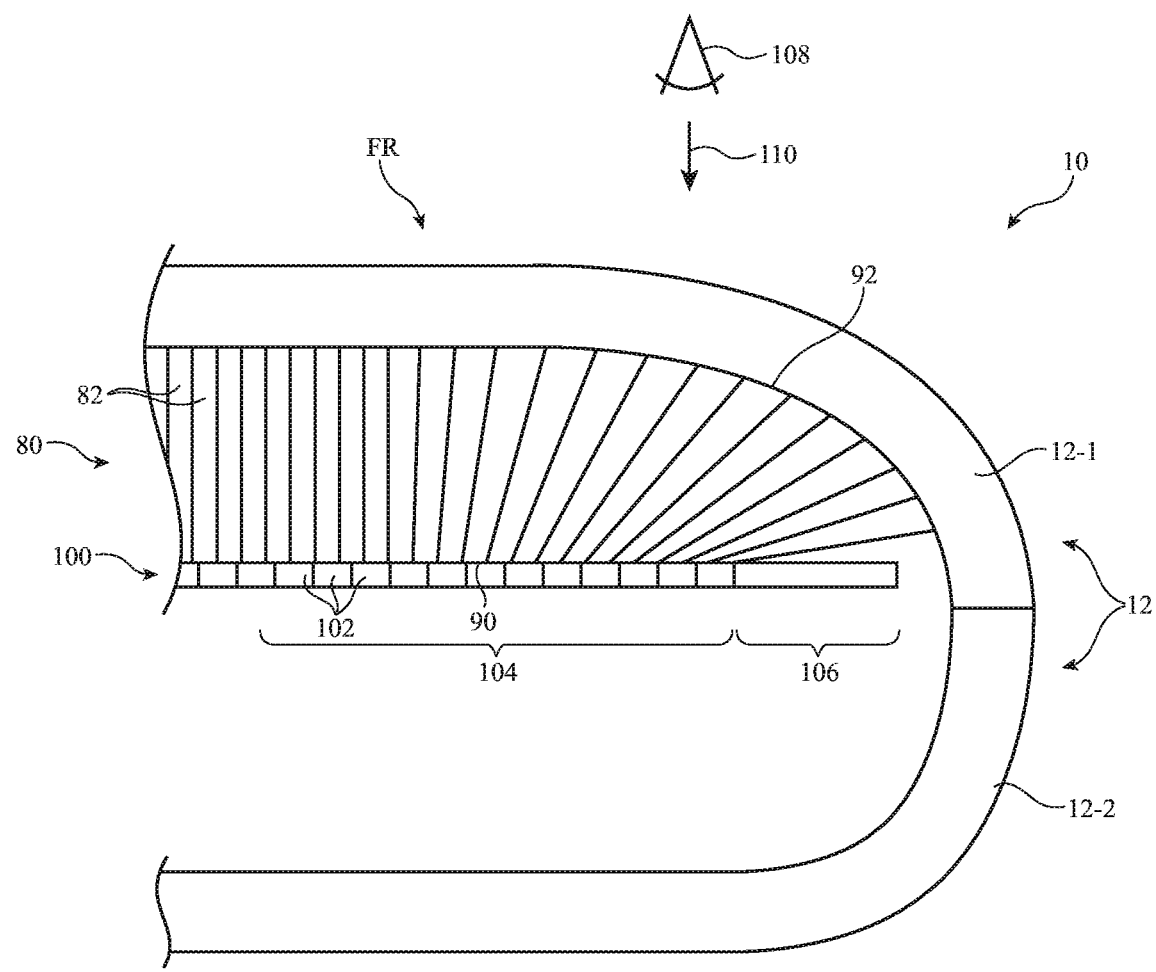
FIGS. 12, 13, and 14 are cross-sectional side views of portions of illustrative electronic devices with image transport layers in accordance with embodiments.

To help hide inactive border area 106 from view by viewer (user) 108, some of fibers 82 of image transport layer 80 may be tilted as shown in FIG. 12. As a result, the image from the pixel array in active area 104 on input surface 90 of layer 80 will be transported to an enlarged output surface 92. Surface 92 overlaps inactive border area 106 when device 10 and display layer 100 are viewed in direction 110 as viewer 108 is viewing front face FR of device 10, so that the image on surface 92 extends to the outermost periphery of device 10 or nearly to the outermost periphery of device 10, thereby hiding inactive border area 106 from view. Image transport layer 80 of FIG. 12 also has a curved edge profile and may have corners of compound curvature.

Figure 13:
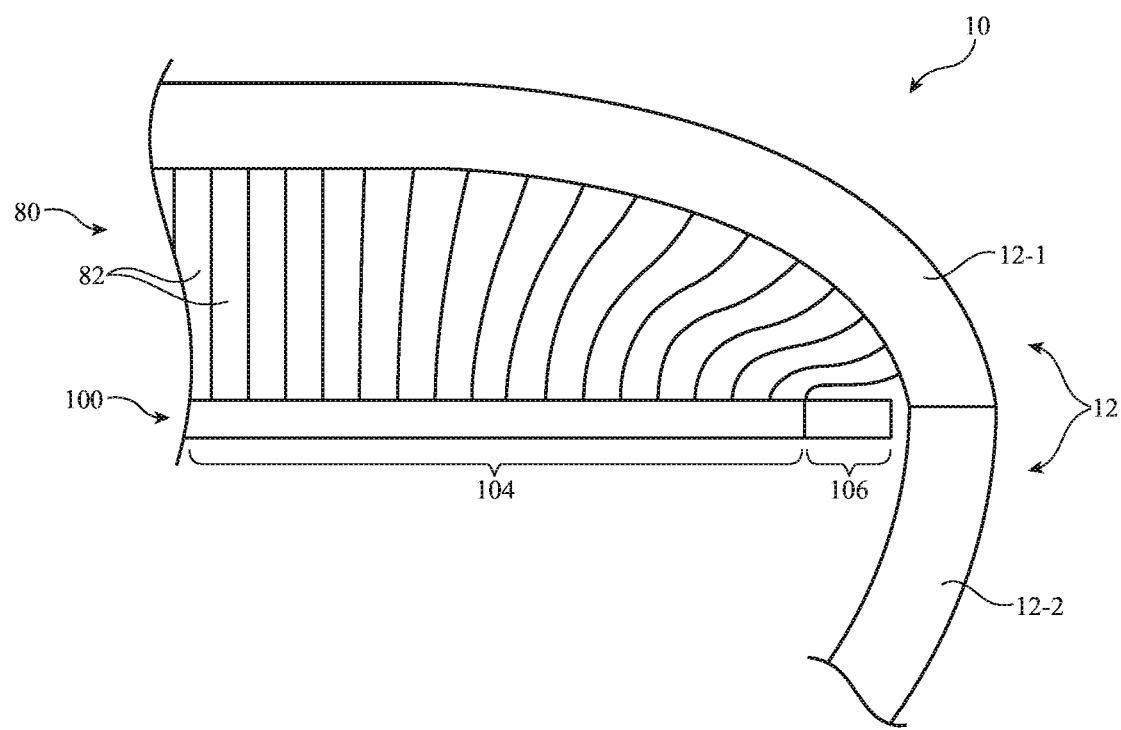
Figure 14:
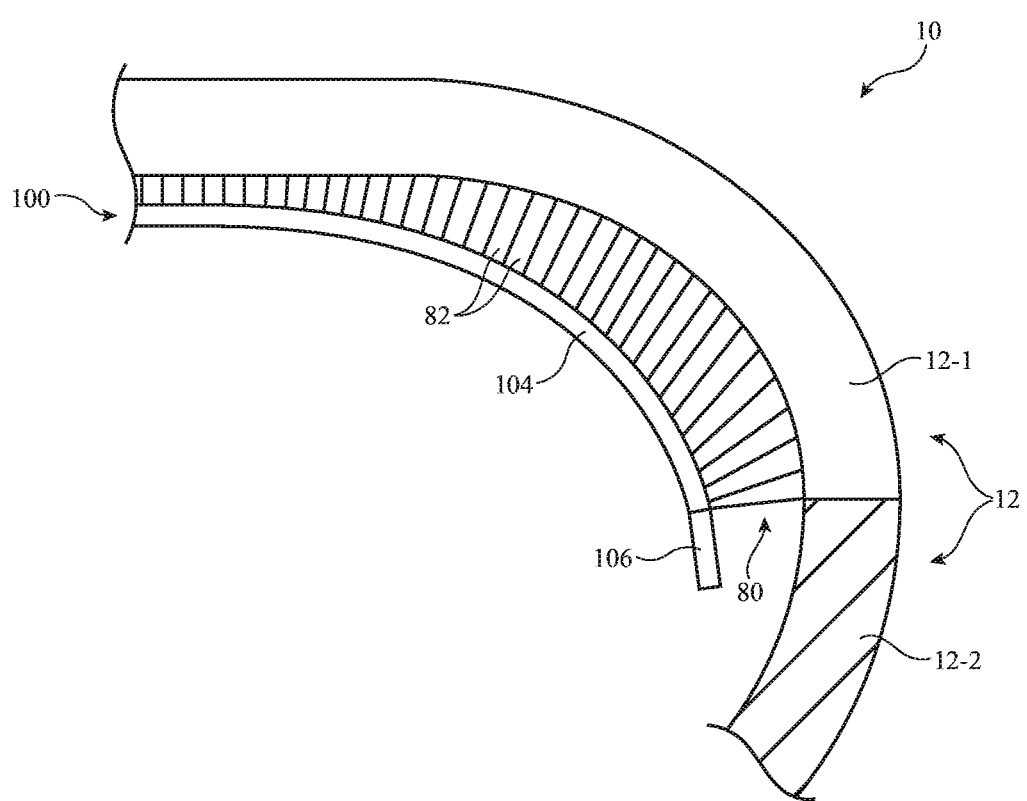

In the example of FIG. 12, fibers 82 are tilted by increasing amounts at increasing distances from the outer edge of area 104 toward the periphery of device 10. If desired, fibers 82 may have one or more bends along their lengths, as shown in the illustrative arrangement for device 10 that is shown in FIG. 13. FIG. 14 shows how display layer 100 may, if desired, have one or more portions that are bent. Layer 100 may, as an example, be formed from an organic light-emitting diode display substrate of polyimide or other flexible polymer covered with thin-film transistors, thin-film organic light-emitting diode pixels, and/or other thin-film circuitry. In this type of arrangement, layer 100 may have one, two, three, four, or more than four edges with curved cross-sectional profiles as shown in FIG. 14. Image transport layer 80 may have a mating curved input surface that receives an image from layer 100 and may have a curved output surface. The curved output surface of image transport layer 80 may mate with the curved inner surface of housing portion 12-1.

Other arrangements for placing image transport layer 80 over display layer 100 may be used, if desired. For example, portions of image transport layer 80 may, if desired, overlap opaque housing structures (e.g., to provide device 10 with a borderless appearance). Image transport layer 80 may also serve as the outermost structure of device 10 (e.g., housing portion 12-1 may be omitted). The configurations of FIGS. 12, 13, and 14 are illustrative.

In some configurations, portions of device 10 are not covered with active portions of display 14 and are therefore available to accommodate components such as sensors 16, speakers, and/or other electrical components. For example, one or more areas on front face FR of device 10 may be available to accommodate electrical components. These areas may be free of pixels and free of any of the output surface of image transport layer 80 that is emitting an image presented to the input surface of that image transport layer. Illustrative front views of device 10 in configurations in which front face FR of device 10 has both areas that emit images and areas that do not emit images are shown in FIGS. 15, 16, and 17.

Figure 15:
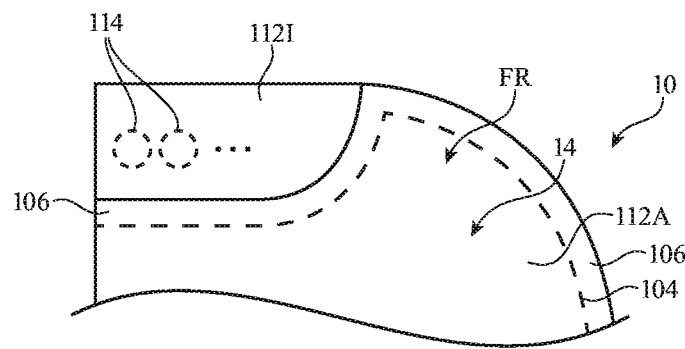
FIGS. 15, 16, and 17 are top views of portions of illustrative electronic devices with displays having inactive areas and image transport layers configured to accommodate electrical components in accordance with embodiments.
Figure 16:
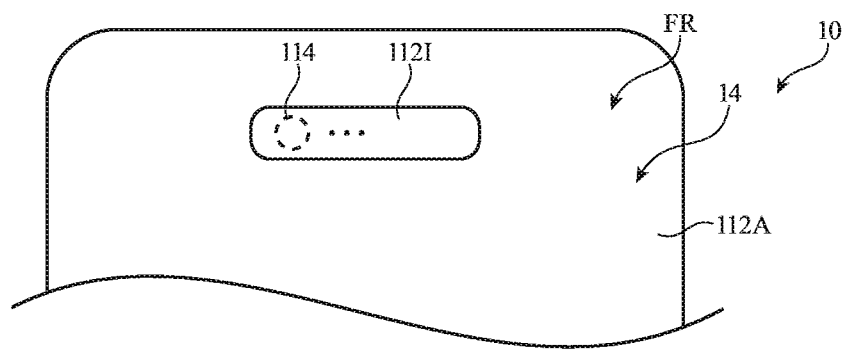

As shown in the example of FIG. 15, front face FR may include a first area such as image area 112A that coincides with the output surface of image transport layer 80 and therefore displays an image and may have a second area such as non-image area 112I that does not display an image and can therefore accommodate electrical components 114 (e.g., a speaker, sensors 16, and/or other electrical components). The pixels in display 14 may, if desired, be confined to a smaller area on front face FR than area 112A. For example, the pixels in display 14 may lie in active area 104 of FIG. 15, which may have a smaller footprint (area when viewed from the front of device 10) than area 112A. Image transport layer 80 may overlap active area 104. For example, the inner surface of image transport layer 80 may form an input surface that coincides active area 104, so that the input surface of image transport layer 80 receives an image being displayed by display 14 using the pixels in active area 104. Fibers 82 in image transport layer 80 may be configured to flare outwardly from active area 104, thereby hiding unsightly structures such as inactive area 106 of display 14. The visually narrows the width of the inactive area 106 of display 14.

Non-image area 112I of FIG. 15 has the shape of a notch that runs partway across the top peripheral edge of device 10. Non-image area 112I may have other configurations, if desired. For example, non-image area 112I may be surrounded by image area 112A as shown in FIG. 16 in which non-image area 112I forms an island that is surrounded on all sides by the pixels in display 14. The pixels in the active area of display layer 100 may surround an island-shaped inactive display area. The input surface of an image transport layer may overlap the pixels and receive an image from the pixels. The fibers of the image transport layer may flare so that some of the output surface of the image transport layer extends over the periphery of the inactive display area (e.g., the island-shaped area of display 14 that is surrounded by pixels). This may minimize the amount of the inactive display area that is visible to a user.

Figure 17:
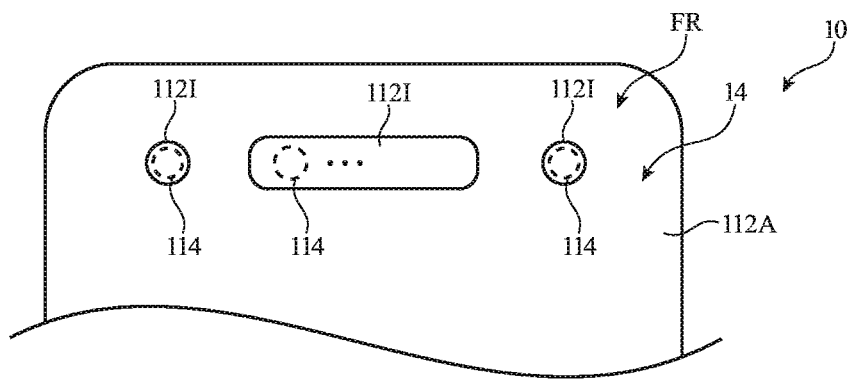

Non-image area 112I may, if desired, have non-contiguous portions as shown by the illustrative set of three parts of non-image area 112I of FIG. 17, each of which forms a respective non-image region surrounded by the pixels of display 14. In configurations in which non-image area 112I has multiple non-contiguous portions, one portion may be aligned with a speaker and one or more additional components may be aligned respectively with one or more image sensors, proximity sensors, ambient light sensor, camera flash components, and/or other optical components.

In arrangements in which the fibers of image transport layer 80 are flared or otherwise configured to overlap some of the inactive area of display 14, an enhanced fraction of non-image area 112I may be used to accommodate sound from a speaker, light for an optical sensor in sensors 16, or other electrical components. Accordingly, the use of image transport layer 80 may allow non-image area 112I to be used to efficiently accommodate electrical components 114.

Although illustrated as being formed on front surface FR of device 10 in the examples of FIGS. 15, 16, and 17, device 10 may have non-image areas such as area 112I and adjacent image areas 112A on any suitable surface(s) of housing 12. The configurations of FIGS. 15, 16, and 17 are illustrative.

There may be one or more electrical components 114 that are aligned with each area 112A and these components may include sensors 16, a speaker, etc. For example, components 114 may include an ambient light sensor such as a color ambient light sensor, a proximity sensor such as an infrared proximity sensor having an infrared light-emitting diode that emits infrared light and a corresponding infrared light detector that makes proximity measurements by detecting how much of the emitted infrared light is reflected back to the infrared light detector from external objects, a flood infrared light illuminator (e.g., an infrared light-emitting diode), an array of lasers (e.g., vertical cavity surface emitting lasers) that form a dot projector (e.g., an optical component that projects an array of infrared light beams as part of a three-dimensional image sensor such as a structured light three-dimensional image sensor, an infrared image sensor in a structured light three-dimensional image sensor, a visible light image sensor (visible light camera), a camera flash (e.g., a visible light-emitting diode), and/or other optical components. In each area 112A, image transport layer 80 may have a fiber-free opening filled with air and/or may have a fiber-free opening filled with a solid material such as glass, transparent polymer, and/or other transparent materials. A display cover layer (see, e.g., housing portion 12-1) may optionally overlap image transport layer 80. If desired, the display cover layer may have one or more openings aligned with one or more corresponding openings in image transport layer 80 (e.g., an opening aligned with each area 112A).

Figure 18:
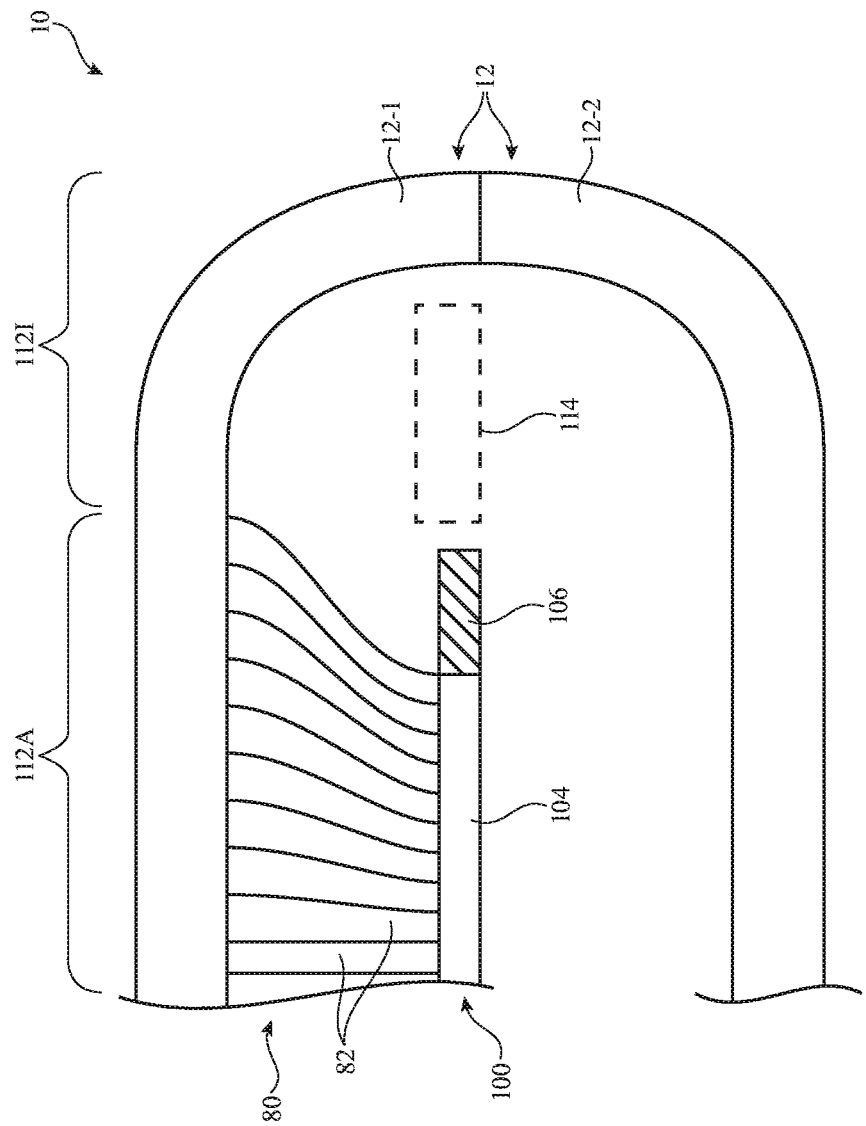
FIG. 18 is a cross-sectional side view of an illustrative electronic device with an image transport layer that reduces the size of an inactive display area in accordance with an embodiment.

FIG. 18 is a cross-sectional side view of device 10 in an illustrative configuration in which image transport layer 80 has an input surface aligned with active area 104 of display layer 100 and has an output surface that is configured to overlap both active area 104 and inactive border area 106 as well as other inactive display regions (e.g., the inactive area occupied by optional component 114 of FIG. 18). The extension of the edge portion of the output surface of image transport layer 80 so that a portion of image transport layer overlaps border area 106 may minimize or eliminate the presence of portions of inactive border area 106 in non-image area 112I. Area 112I may form a notch along one of the peripheral edges of device 10 and/or may have other suitable shapes. One or more electrical components 114 may be mounted in area 112I, as shown in FIG. 18 and as described in connection with FIGS. 15, 16, and 17.

Housing 12 may have transparent portions that serve as a display cover layer overlapping image transport layer 80. Housing 12 may, as an example, have a first portion such as portion 12-1 that is formed from transparent glass, transparent polymer, transparent sapphire or other crystalline material, and/or other clear material. Portion 12-1 may overlap and protect image transport layer 80.

A layer of adhesive (e.g., clear polymer) or other material may help optically couple the outer surface of image transport layer 80 to the opposing inner surface of housing portion 12-1. A touch sensor layer (e.g., a flexible polymer substrate with transparent capacitive touch sensor electrodes such as indium tin oxide electrodes) may be interposed between the outer surface of image transport layer 80 and the inner surface of portion 12-1, capacitive touch sensor electrodes or other structures may be formed on the inner surface of portion 12-1, and/or other sensor structures may be formed between image transport layer 80 and portion 12-1, if desired. As shown in FIG. 18, housing 12 may have a portion such as portion 12-2 that is coupled to portion 12-1. Portion 12-2 may be formed from the same material as portion 12-1 or may be formed from a different material (polymer, glass, metal, ceramic, natural materials, and/or other materials).

Figure 19:
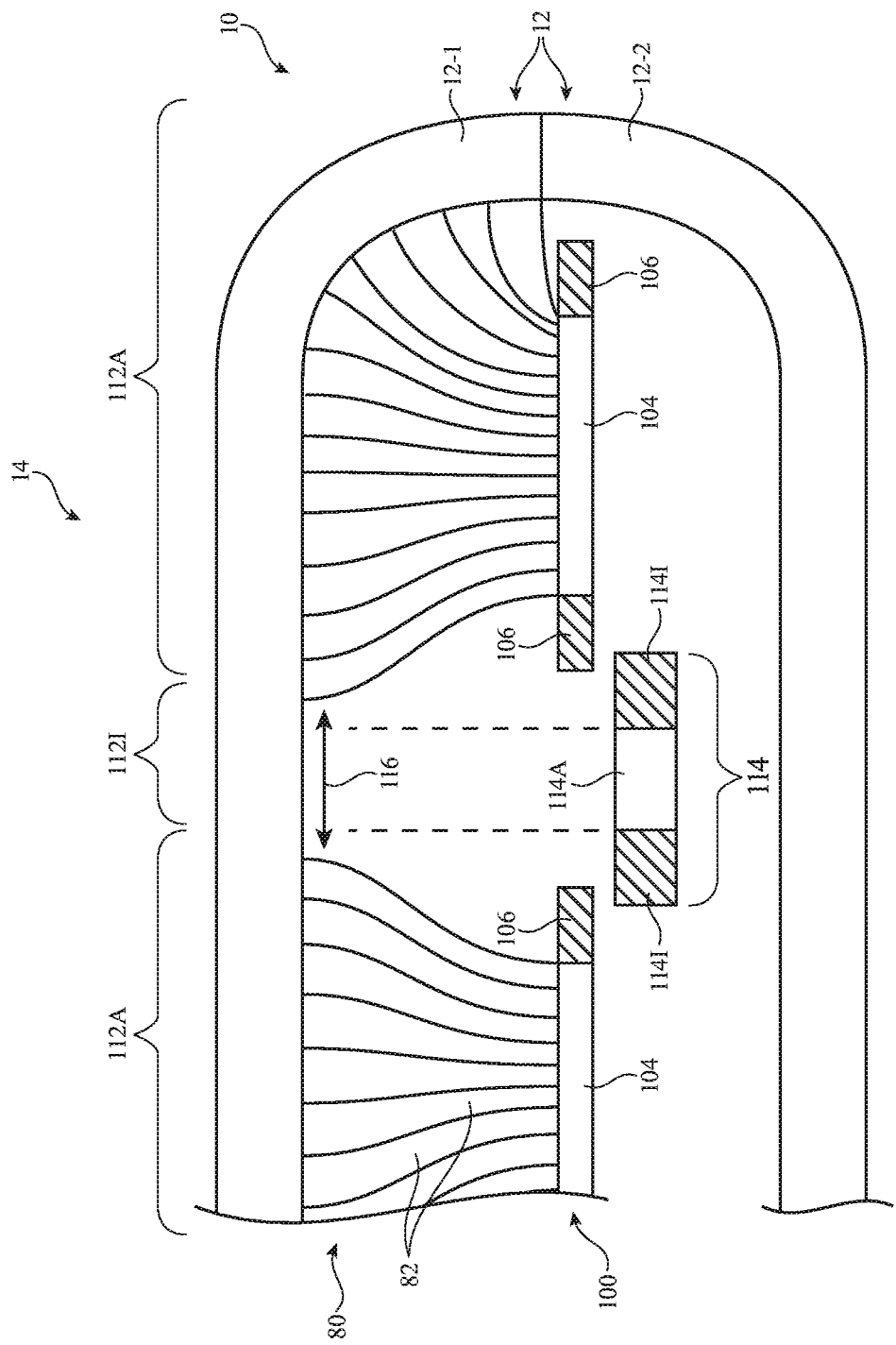
FIG. 19 is a cross-sectional side view of an illustrative electronic device with an image transport layer that reduces the size of an inactive area that is surrounded by pixels in a display and that includes an electrical component aligned with an opening in the image transport layer in accordance with an embodiment.

In the example of FIG. 19, device 10 has a configuration of the type shown in FIGS. 16 and 17 in which non-image area 112I is surrounded by image area 112A (e.g., non-image area 112I is an island within image area 112A). The cross-sectional side view of device 10 that is shown in FIG. 19 is taken through non-image area 112I and shows how an electrical component such as component 114 may have an active portion such a portion 114A that is aligned with non-image area 112I. Image transport layer 80 may have fibers 82 that are flared over inactive border area 106 of display layer 100 to hide inactive border area 106 from view and/or may be flared over other structures in the inactive area (pixel-free area) of display 14 (e.g., portions of the display other than active area 104).

As shown in FIG. 19, component 114 may have an inactive portion such as portion 114I. Inactive portion 114I may include component housing walls such as opaque metal and/or polymer structures for mounting component 114 in device 10 and/or may contain other portions of device 10 that do not emit or receive light, emit or receive acoustic signals, and/or that do not emit or receive other signals during operation. As a result, inactive portion 114I may be placed under the overhanging inactive portions of display layer 100 around the periphery of the island-shaped inactive area of display 14. This allows inactive portion 114I of component 114 to be hidden from view.

Image transport layer 80 of FIG. 19 has an opening such as opening 116 that corresponds to non-image area 112I and that overlaps active portion 114A of component 114. Because fibers 82 are flared inwardly, the size of opening 116 and non-image area 112I can be minimized while providing sufficient clearance for active area 114A of component 114 to receive light, emit light, receive and/or emit acoustic signals, or to emit and/or receive other signals through opening 116 (e.g., inactive area 106 and other potentially unsightly structures in the pixel-free area can be covered by the flared fibers 82 in image transport layer 80).

Figure 20:
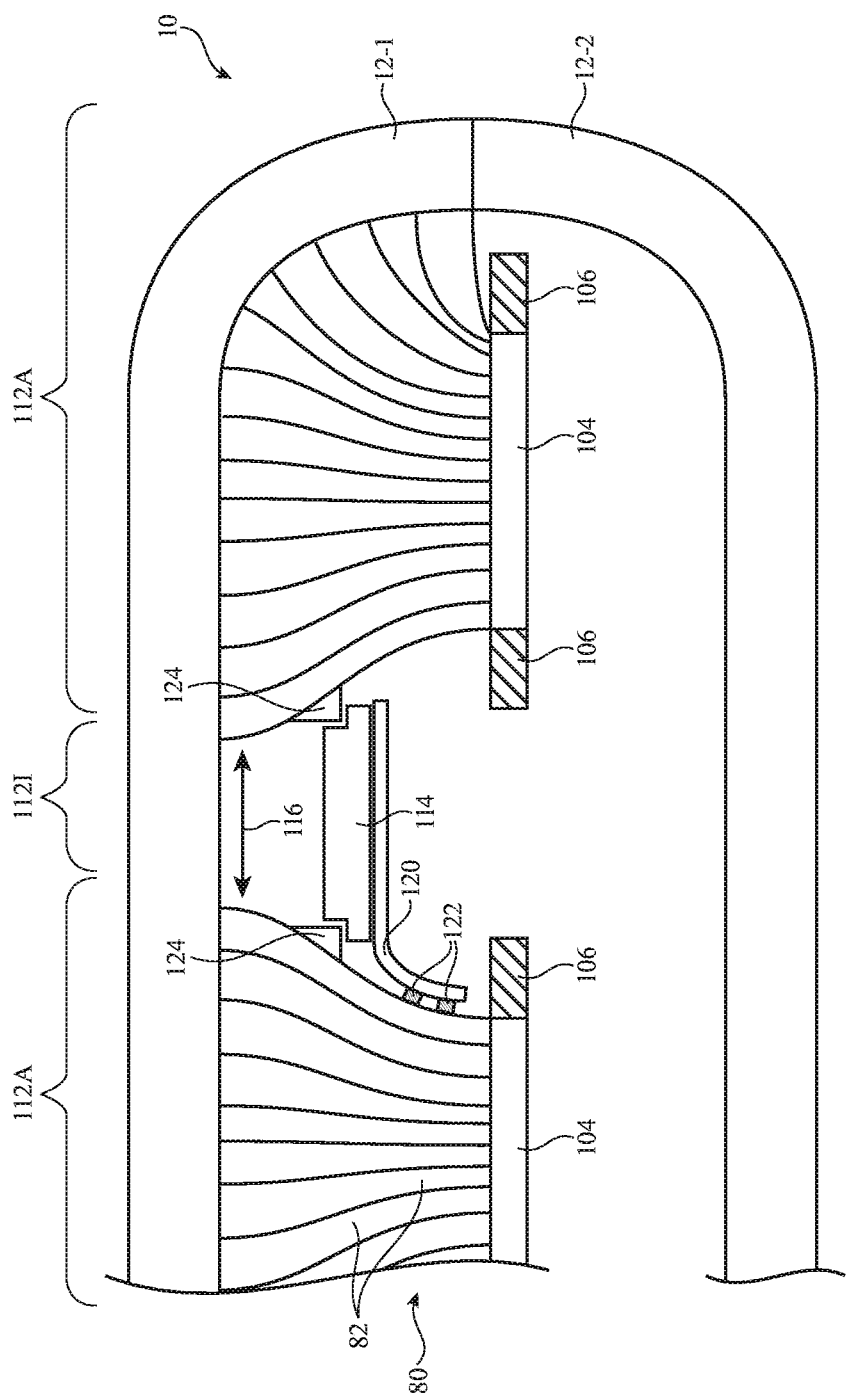
FIG. 20 is a cross-sectional side view of an illustrative electronic device with an image transport layer that is configured to accommodate mounting of an electrical component in accordance with an embodiment.

As shown in FIG. 20, image transport layer 80 may be configured to facilitate mounting of component 114 in alignment with openings 116. Image transport layer 80 may be configured to form an island-shaped opening (e.g., a hole) such as opening 116 of FIG. 20 or may be configured to form a notch-shaped opening (notch) along one of the edges of device 10 (see, e.g., the notch in image transport layer 80 of FIG. 18). Component 114 may be mounted to flexible printed circuit 120. Metal traces 122 may be formed on image transport layer 80 (e.g., on surfaces of image transport layer 80 facing opening 116 as shown in FIG. 20), may be formed on a flexible printed circuit such as flexible printed circuit 120, may be formed from a cable, may be formed from wires, and/or may be formed from other signal path structures in device 10. Using signal paths such as signal paths formed from metal traces 112, control circuitry 20 (FIG. 1) may send signals to component 114 and/or may receive signals from component 114. Component mounting structures 124 may be coupled to image transport layer 80 and configured to support component 114. Portions of image transport layer 80 may be molded, machined, or otherwise processed to form component mounting structures 124 (e.g., mounting structures 124 may be integral portions of image transport layer 80) and/or component mounting structures 124 may be separate structures that are attached to image transport layer 80 using adhesive, screws or other fasteners, clips, springs, and/or other attachment structures.

Figure 21:
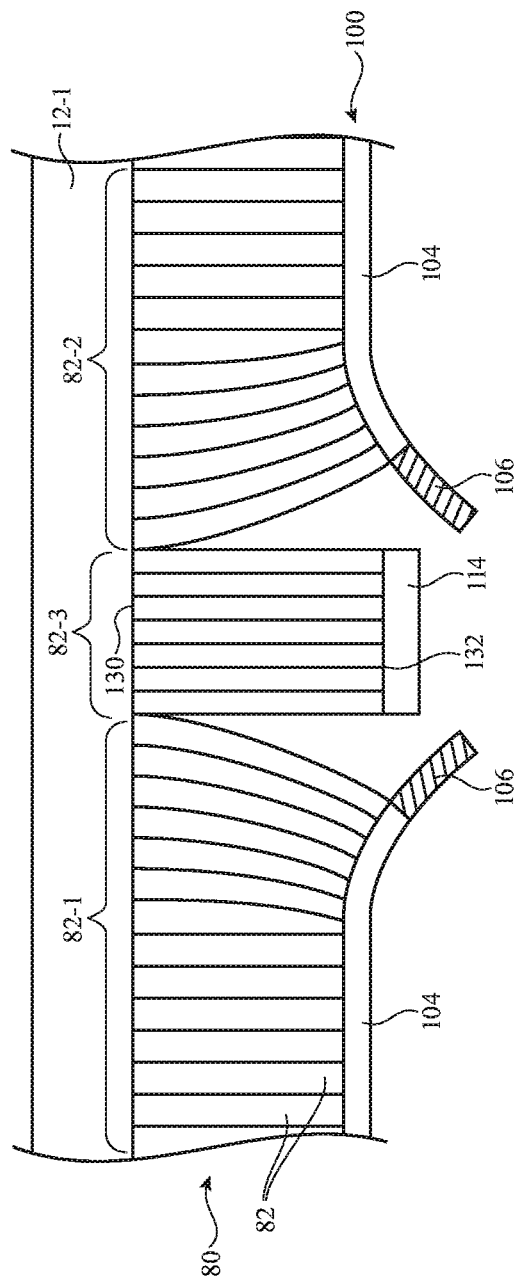
FIG. 21 is a cross-sectional side view of an illustrative electronic device with an image transport layer with a portion that conveys light for an optical component that is located in an inactive display area in accordance with an embodiment.

If desired, a portion of image transport layer 80 and/or separate image transport layer material (e.g., a separate bundle of fibers 82 and/or separate piece of Anderson localization material) may be used in routing light to and/or from an optical component such as component 114. Consider, as an example, the arrangement of FIG. 21. As shown in FIG. 21, image transport layer 80 may be configured so that fibers 82-1 and 82-2 are flared and help direct light from active area 104 of display layer 100 to an associated output surface that is attached to the inner surface of a display cover layer (e.g., transparent housing portion 12-1). The bent shape of display layer 100 may help hide inactive border area 106 of layer 100. At the same time, image transport layer 80 (or a separate image transport layer structure) may be used to form fibers 82-3. Fibers 82-3 may have a first surface such as surface 130 that faces outwardly and is adjacent to and/or attached to the inner surface of housing portion 12-1 with adhesive. Fibers 82-3 also have an opposing second surface such as surface 132 that faces and/or is adjacent to electrical component 114. Component 114 of FIG. 21 may be any suitable component that emits and/or receives light through fibers 82-3. As an example, component 114 may include one or more visible light-emitting diodes, visible lasers, displays, infrared components such as infrared light-emitting diodes and/or infrared lasers, image sensors such as visible and/or infrared image sensors, ambient light sensors (e.g., color ambient light sensors), optical proximity sensors, dot projectors for three-dimensional image sensors, infrared digital image sensors for three-dimensional image sensor systems, gesture sensors (e.g., three-dimensional image sensors such as infrared structured light three-dimensional image sensors), camera flashes, etc.

In some configurations, components 114 may include both a light-emitting component and a light-detecting component. For example, component 114 may be an infrared proximity sensor that includes a light-emitting devices (light source) such as an infrared light-emitting diode or infrared laser and that includes a corresponding infrared light detector (e.g., a photodetector). During operation, the light source emits light that travels through fibers 82-3 and reflects from the surface of a user's face or other external object. The reflected light passes through fibers 82-3 and is received by the light detector in component 114. To help reduce visible light interference with the reflected infrared light, fibers 82-3 may be infrared-light-transmitting-and-visible-light-blocking fibers (e.g., fibers formed from a polymer or other material that is configured to block visible light by at least 90% or other suitable amount while transmitting infrared light by at least 10%, at least 30%, at least 60%, or other suitable amount). Infrared-light-transmitting-and-visible-light-blocking filter material may also be interposed between surface 132 of fibers 82-3 and component 114 (e.g., a light detector in component 114), if desired.

Figure 22:
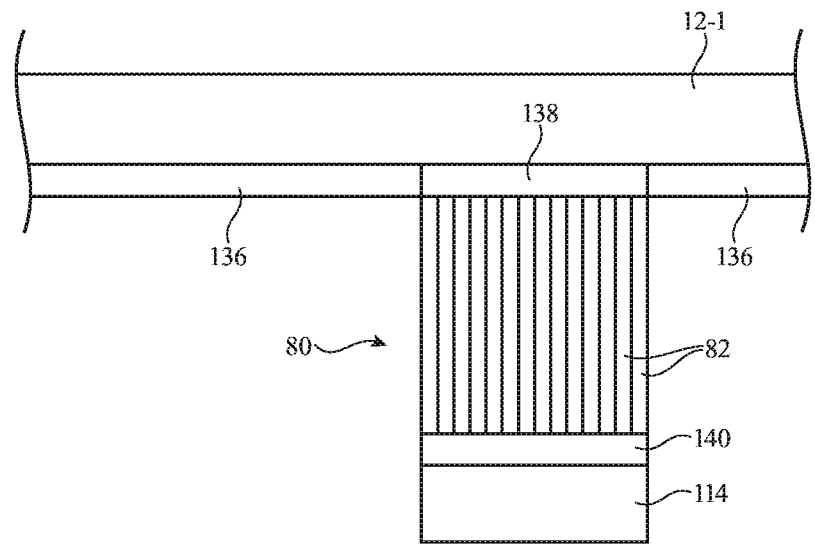
FIGS. 22 and 23 are cross-sectional side views of illustrative image transport structures configured to route light for an optical component in an electronic device in accordance with an embodiment.

In the illustrative configuration of FIG. 22, image transport layer 80 has been configured to form a light pipe that guides light to and/or from component 114. Housing portion 12-1 may be a portion of a display cover layer or other transparent housing structure. Opaque masking material 136 or other structures may have an opening. The opening may be covered by window material 138. Window material 138 may be more transparent to visible light than masking material 136, so that some visible light is guided through fibers 82 to component 114. Component 114 may be, for example, a color ambient light sensor that is configured to measure ambient light color and intensity.

Figure 23:
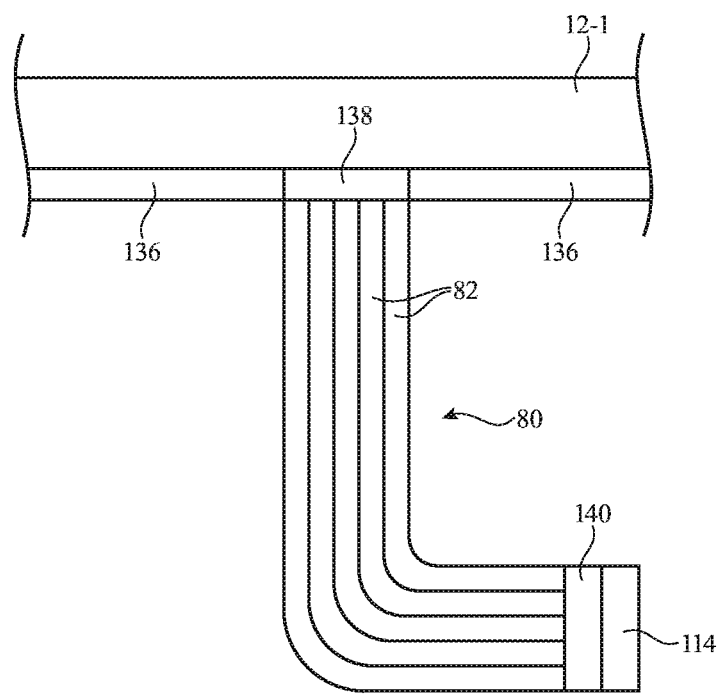

As shown in FIG. 22, optional filter 140 (e.g., an infrared-light-blocking filter) may be interposed between layer 138 and component 114. If desired, component 114 may emit visible and/or infrared light, may be a display device (e.g., a pixel array), may be an image sensor, may be an ambient light sensor, may be a detector and/or emitter for an optical proximity sensor and/or may be another suitable optical component. The light pipe formed by fibers 82 of image transport layer 80 may be cylindrical or may have other suitable shapes. Light such as ambient light being measured by an ambient light sensor may be homogenized when passing through the light pipe. The light pipe may be formed from infrared-light-blocking-and-visible-light-transmitting fibers or fibers of other desired optical properties. If desired, the light pipe may have an elongated shape (e.g., a shape that is longer along its longitudinal axis than its diameter or other lateral dimension) so that the light pipe may carry light past internal objects and/or around corners. The light pipe formed from fibers 82 may, if desired, be bent one or more times along their length (e.g., to form a bent light pipe of the type show in FIG. 23). Bent and/or straight light pipes formed from fibers 82 may be formed as separate light pipes and/or as light pipes that are parts of larger fiber bundle structures (e.g., a larger image transport layer structure overlapping display 14, etc.).

Figure 24:
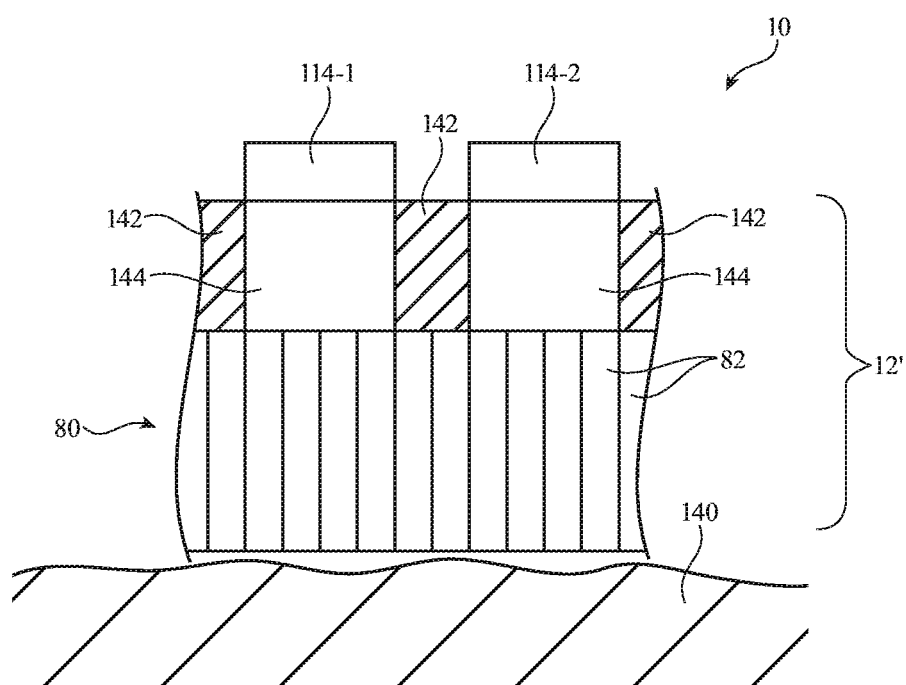
FIG. 24 is a cross-sectional side view of a portion of an illustrative electronic device having an image transport layer overlapping an optical sensor such as a heart rate sensor in accordance with an embodiment.

Image transport layer 80 may, if desired, be used in carrying light associated with a heart rate sensor or other biometric sensor. Device 10 may be, for example, a wristwatch device or other wearable device that is worn against the skin of user's body. As shown in FIG. 24, device 10 may be worn so that housing 12' and image transport layer 80 face user's body 140 (e.g., the skin of the user's wrist or other body part). If desired, a layer of glass, polymer, or other material may be include in housing 12' and may serve as a cover layer that forms a protective outer layer for image transport layer 80. Housing 12' may also include opaque structures 142 (e.g., opaque polymer, metal and/or other material with opaque structures). Transparent structures 144 may serve as windows that allow visible and/or infrared light to pass. Infrared and/or visible (e.g., green) light may be emitted by a light source in component 114 such as light source 114-1 and may be detected by a light detector in component 114 such as light detector 114-2. With one illustrative arrangement, light source 114-1 and light detector 11402 form a heart rate sensor (heart rate monitor) in which light source 114-1 emits green light or other light into body 140 and in which light detector 114-2 measures the amount of emitted light that is backscattered (reflected) from body 140. With this arrangement, the blood flow of a user can be measured and used to detect the user's heart rate. Due to the presence of fibers 82 in image transport layer 80, emitted light from light source 114-1 may be efficiently coupled into body 140 with reduced loss and interference and scattered (reflected) portions of the emitted light may be efficiently conveyed to light detector 114-2 (e.g., with reduced noise and therefore an enhanced signal-to-noise ratio).

Figure 25:
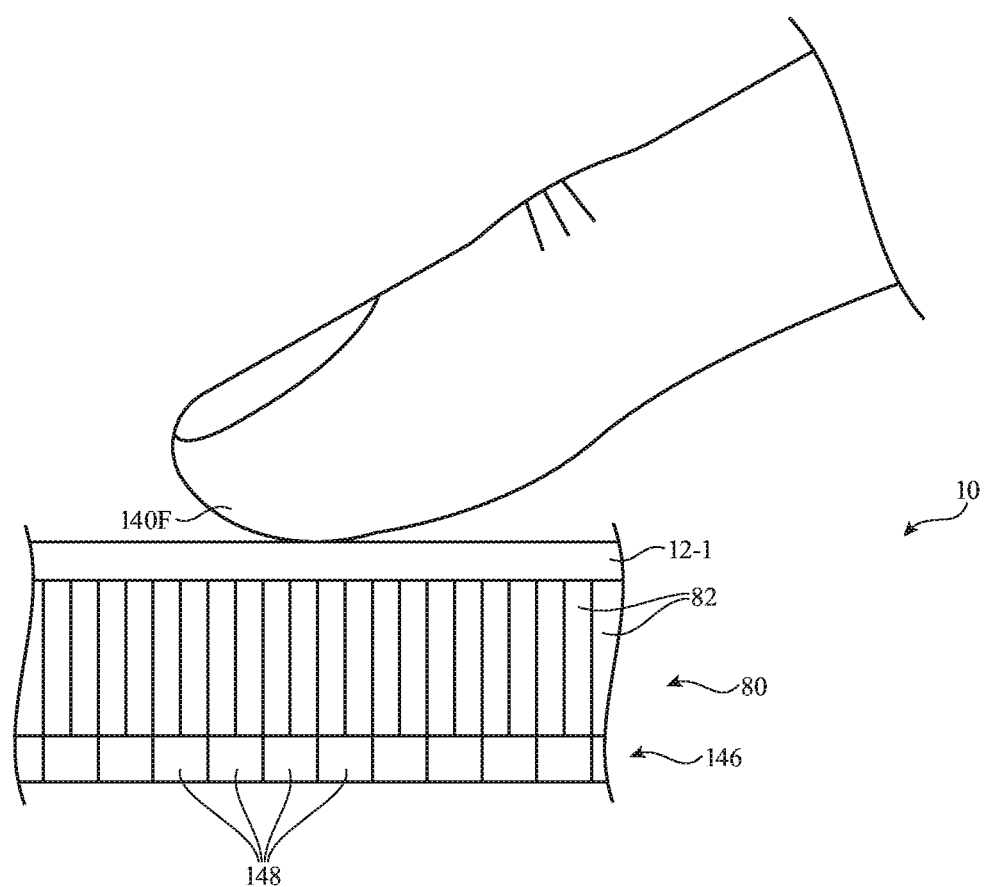
FIG. 25 is a cross-sectional side view of a portion of an illustrative electronic device having an image transport layer overlapping circuitry that makes finger measurements in accordance with an embodiment.

In the example of FIG. 25, image transport layer 80 is interposed between housing portion 12-1 (e.g., a transparent housing layer such as a layer of glass, polymer, sapphire or other crystalline material, transparent ceramic, etc.) and electrical component 146. During operation of device 10, a user may place a body part such as finger 140F against the outer surface of housing portion 12-1. Component 146 can use light to measure the user's fingerprint and/or to gather touch input from the user's finger. Component 146 may have an array of cells 148. Each cell 148 may contain a light source such as a light-emitting diode (e.g., an organic light-emitting diode or a crystalline semiconductor light-emitting diode die) or a single cell or an external light source may provide light. The light may illuminate the underside of finger 140F. If desired, cells 148 may be arranged in an array and may form pixels in a display that displays an image for a user. Configurations in which cells 148 are formed under a pixel array in a display may also be used. The light-emitting diodes of cells 148 may be used as photodetectors and/or some or all of cells 148 may contain other light sensors (e.g., photodetectors formed from other devices than the light-emitting diodes of cells 148). During operation, light may be emitted by a light source (e.g., light sources in one or more of cells 148 and/or other light sources) and emitted light that has scattered (reflected) from finger 140F or other external object may be detected by the light sensors of one or more of cells 148. This allows component 146 to serve as an optical fingerprint sensor or a touch sensor. By using a two-dimensional array of cells 148 in component 146, two-dimensional fingerprint data and/or two-dimensional touch input from contact of finger 140F with the outer surface of housing portion 12-1 may be gathered. Fingerprint information may be used in unlocking device 10 and/or performing other authentication functions. Touch input may be used in selecting on-screen options and/or in otherwise controlling the operation of device 10 and/or a system in which device 10 is operating.

Figure 26:
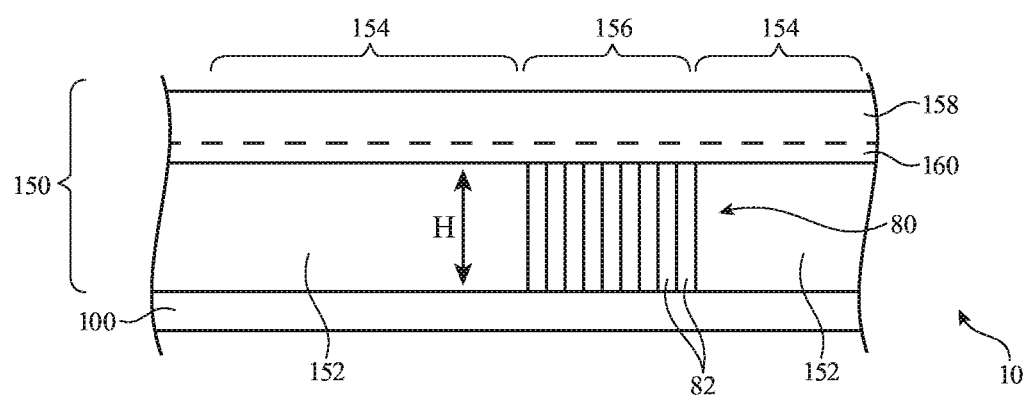
FIG. 26 is a cross-sectional side view of a portion of an illustrative electronic device having an image transport layer configured to form an image for a floating button in accordance with an embodiment.

Another illustrative configuration for device 10 that includes an image transport layer is shown in FIG. 26. In the example of FIG. 26, display layer 100 has an array of pixels that display an image. The housing of device 10 of FIG. 26 includes transparent outer layer 158 (e.g., a display cover layer). Layer 158 overlaps display 100, so that an image on display 100 can be viewed through layer 158. In some areas of display 100 such as area 154, display 100 is overlapped by transparent material 152 (e.g., polymer, air, glass, etc.). In other areas of display 100 such as area 156, image transport layer 80 is interposed between layer 158 and display 100. Image transport layer 80 has an input surface adjacent to display 100 that receives part of the image displayed by display 100 and has a corresponding output surface adjacent to layer 158 on which the received image is displayed. The output surface of image transport layer 80 is separated from display layer 100 by height H, so the image on the output surface of image transport layer 80 appears to float above the rest of the image on display 80. If desired, a two-dimensional touch sensor (e.g., capacitive touch sensor 160) may be formed on the inner side of layer 158 (e.g., so that the touch sensor is interposed between layer 80 and layer 158 and, if desired, so that the touch sensor is interposed between transparent material 152 and layer 158). During operation, a user can supply touch input to the surface of the floating button in region 156 and control circuitry 20 can take action based on the touch input. Touch input can also be gathered when the user touches portions of area 154. If desired, some or all of the portion of layer 100 that is not overlapped by image transport layer 80 of FIG. 26 may be omitted.

Figure 27:
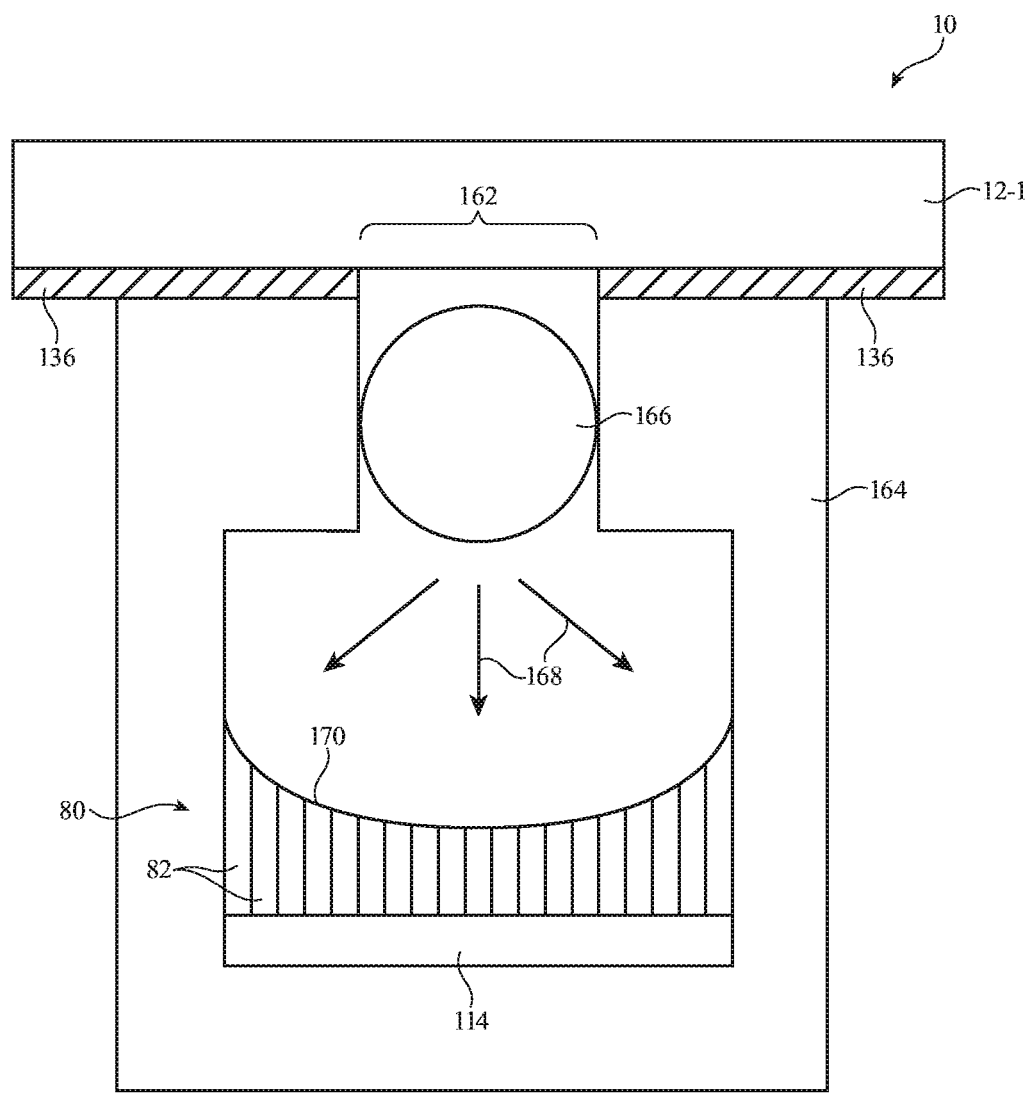
FIG. 27 is a cross-sectional side view of a portion of an illustrative electronic device with a field flattener formed from an image transport layer with a curved input surface in accordance with an embodiment.

Image transport layer 80 may be configured to serve as a field flattener in an optical system. Consider, as an example, the arrangement of FIG. 27. As shown in FIG. 27, device 10 may have a transparent member such as housing portion 12-1 (e.g., a clear layer of glass, polymer, sapphire, or other material that forms part of a rear housing wall, display cover layer, camera window, or other transparent structure in device 10). A layer of opaque masking material 136 may be formed on the inner surface of housing portion 12-1. Opening 162 in the layer of opaque masking material may form an optical window for a visible light camera. The visible light camera includes a digital image sensor (component 114). Component 114 may be mounted in support structure 164. A layer of adhesive or other mounting mechanism may be used to attach support structure 164 to the inner surface of housing portion 12-1. Image transport layer 80 may have a curved input surface such as surface 170 (e.g., a concave spherical surface or other surface with a curved cross-sectional profile) that faces lens 166 and may have a planar output surface that is adjacent to the planar surface of sensor 114. Lens 166 may be a spherical lens (a ball lens) or other lens. During operation, lens 166 may receive image light from the environment surrounding device 10 through the window formed by opening 162 and may focus this image light 168 onto curved surface 170 of the field flattener formed by image transport layer 80. The presence of the field flattener formed from image transport layer 80 helps reduce optical aberrations that would otherwise be introduced by the presence of a spherical lens. The use of a spherical lens in the camera of FIG. 27 may help reduce the size of the camera system.

Figure 28:
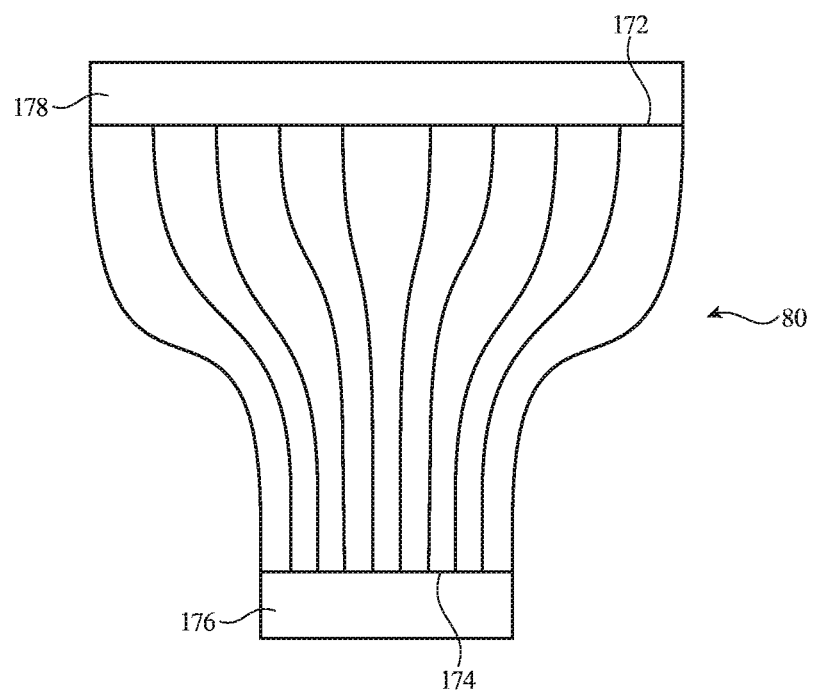
FIG. 28 is a cross-sectional side view of an illustrative image transport layer with a taper in accordance with an embodiment.

As shown in FIG. 28, image transport layer 80 may have a taper. For example, image transport layer 80 may have opposing first and second surfaces such as first surface 172 and second surface 174.

In one illustrative arrangement, component 178 is present and component 176 is not present. Component 178 may emit light. For example, component 178 may be a display that displays an image. Surface 172 of image transport layer 80 may serve as an input surface that receives the image or other emitted light. Surface 174 may serve as an output surface. A reduced-size image of enhanced intensity and/or other intensified light may be viewed at surface 174.

In another illustrative arrangement, component 178 is not present and component 176 is present. In this arrangement, component 176 may emit light (e.g., component 176 may be a display that displays an image). Surface 174 may serve as an input surface that receives the emitted light (e.g., that receives the image displayed on the display). Surface 172 may serve as an output surface on which an enlarged (size-enhanced) version of the image presented to surface 174 may be viewed. If desired, component 176 may be a light sensor that detects light of increased intensity through image transport layer 80.

Tapered image transport layers such as image transport layer 80 of FIG. 28 and/or other image transport layers may be provide with planar input and output surfaces as shown in FIG. 28 and/or may have one or more surfaces with curved cross-sectional profiles. As an example, input surface 180 of image transport layer 80 of FIG. 29 may receive an image or other output light from component 182 (e.g., a display) so that a transported version of the received image (or other light) may be viewed on curved output surface 184. Surface 184 may, if desired, have compound curvature. As an example, surface 184 may have a depressed central section surrounded by a ridge and may serve as a touch sensitive button on a portion of the housing of device 10 (as an example).

Figure 29:
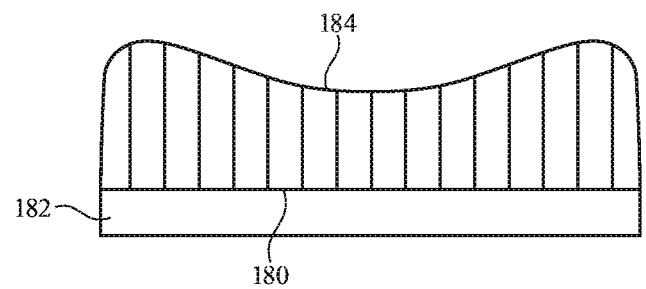
FIGS. 29 and 30 are cross-sectional side views of illustrative image transport layers with curved surfaces in accordance with embodiments.
Figure 30:
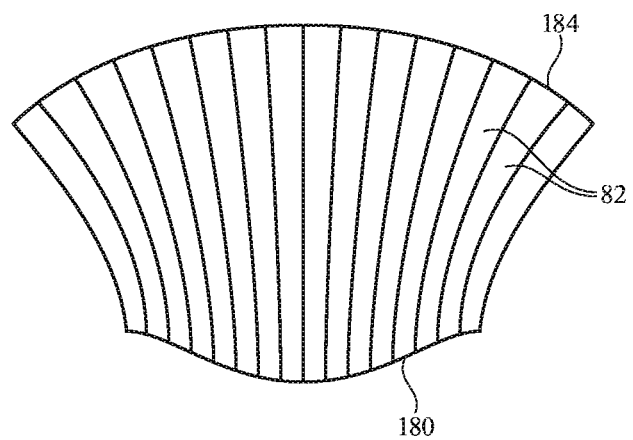

FIG. 30 is a cross-sectional side view of image transport layer 80 in an illustrative configuration in which both input surface 180 and output surface 184 have curved cross-sectional profiles (e.g., surface 180 and/or surface 184 may have compound curvature) and in which image transport layer 80 is tapered (e.g., fibers 82 flare outwardly towards surface 184 and flare inwardly towards surface 180). Structures such as the image transport layer structures of FIGS. 28, 29, and 30 that have tapers, bends, portions with straight fibers 82, planar surfaces and/or curved surfaces such as surfaces with compound curvature may be used on front face FR, rear face RR, and/or sidewalls W of device 10 and/or may be used in other portions of device 10. The arrangements of FIGS. 28, 29, and 30 are illustrative.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
   pixels configured to display an image;
   an image transport layer having an input surface that receives the image and an output surface to which the received image is transported through the image transport layer; and
   a display cover layer having a planar portion and a curved portion, wherein the planar portion and the curved portion overlap the image transport layer.

2. The electronic device defined in claim 1 wherein the image transport layer comprises a plurality of fibers formed in a single layer and wherein each of the fibers extends from the input surface to the output surface.

3. The electronic device defined in claim 2 wherein the display cover layer has an edge and has a curved portion that overlaps given fibers of the plurality of fibers.

4. The electronic device defined in claim 3 wherein the given fibers extend vertically.

5. The electronic device defined in claim 3 wherein the given fibers are tilted by progressively increasing amounts toward the edge.

6. The electronic device defined in claim 3 wherein the given fibers are curved and tilted by progressively increasing amounts toward the edge.

7. The electronic device defined in claim 3 wherein each of the given fibers has a length and wherein each of the given fibers comprises multiple bends along the length.

8. A cellular telephone, comprising:
   pixels configured to display an image; and
   an image transport layer having an input surface that receives the image and an output surface to which the image is transported, wherein the output surface has a curved portion, and wherein the image transport layer comprises:
      a lower portion with a first set of fibers, wherein the first set of fibers have first ends that form the input surface and second ends, and
      an upper portion with a second set of fibers, wherein the second set of fibers have third ends facing the second ends of the first set of fibers, and fourth ends that form the output surface.

9. The cellular telephone defined in claim 8 wherein the first set of fibers are oriented vertically in the curved portion.

10. The cellular telephone defined in claim 9 wherein the second set of fibers are oriented at a non-zero angle relative to the first set of fibers in the curved portion.

11. The cellular telephone defined in claim 10 wherein the second ends of the first set of fibers in the curved portion of the image transport layer are curved.

12. The cellular telephone defined in claim 8 wherein the input surface has an additional curved portion.

13. A wearable electronic device having a front and a rear, the wearable electronic device comprising:
   a housing comprising a transparent layer facing the front, wherein the transparent layer has a curved portion;
   a display in the housing, wherein the display comprises an active area configured to display an image and an inactive area that is overlapped by the curved portion of the transparent layer; and
   an image transport layer that overlaps the display and transports the image to the curved portion of the transparent layer.

14. The wearable electronic device defined in claim 13 wherein the transparent layer is formed from glass.

15. The wearable electronic device defined in claim 14 wherein the housing comprises an additional glass layer facing the rear.

16. The wearable electronic device defined in claim 15 wherein the additional glass layer has an additional curved portion that is coupled to the curved portion of the transparent layer.

17. The wearable electronic device defined in claim 14 wherein the housing comprises a metal layer facing the rear, wherein the metal layer has an additional curved portion that is coupled to the curved portion of the transparent layer.

18. The wearable electronic device defined in claim 13 wherein the image transport layer comprises Anderson localization material.

19. The wearable electronic device defined in claim 13 wherein the image transport layer comprises a coherent fiber bundle.

20. The wearable electronic device defined in claim 13 wherein the housing is configured to be worn on a user's wrist.

21. An electronic device, comprising:
   pixels configured to display an image, wherein the pixels surround an area without pixels; and
   an image transport layer having an input surface that receives the image and an output surface to which the received image is transported through the image transport layer, wherein the image transport layer has an opening that is aligned with the area.

22. The electronic device defined in claim 21 wherein the image transport layer has a portion that overlaps a peripheral portion of the area and blocks the peripheral portion of the area from view, wherein the electronic device further comprises a camera and an ambient light sensor in the area, and wherein the camera and the ambient light sensor receive light through the opening in the image transport layer.

23. The electronic device defined in claim 22 wherein the image transport layer comprises a coherent fiber bundle.

24. The electronic device defined in claim 22 wherein the image transport layer comprises Anderson localization material.

25. The electronic device defined in claim 21 wherein the pixels form a display having a periphery and wherein a display cover layer overlaps the pixels and has a portion with a curved surface profile at the periphery.

26. The electronic device defined in claim 25 wherein the image transport layer has an edge portion with a curved surface profile at the periphery.

27. The electronic device defined in claim 26 wherein the electronic device has a housing structure that is coupled to the display cover layer and wherein the housing structure includes a metal sidewall that runs along the periphery.

28. The electronic device defined in claim 21 wherein the electronic device comprises an optical component that is configured to transmit light through the opening in the image transport layer.

29. The electronic device defined in claim 28 wherein the optical component is configured to transmit infrared light through the opening in the image transport layer.

30. The electronic device defined in claim 29 further comprising an infrared image sensor that is configured to receive infrared light through the opening in the image transport layer.

31. The electronic device defined in claim 21 further comprising:
an optical component that receives light through the opening; and
component mounting structures that are configured to couple the optical component to the image transport layer.

32. The electronic device defined in claim 21 further comprising a metal trace on the image transport layer.

33. An electronic device, comprising:
a display;
a housing structure coupled to the display;
a coherent fiber bundle; and
an optical component configured to receive light through the coherent fiber bundle.

34. The electronic device defined in claim 33 wherein the optical component comprises an ambient light sensor and wherein the coherent fiber bundle comprises fibers formed from infrared-light-transmitting-and-visible-light-blocking material.

35. The electronic device defined in claim 33 wherein the coherent fiber bundle has a bend.

36. The electronic device defined in claim 33 wherein the coherent fiber bundle has a first portion that conveys the light to the optical component and has a second portion with an input surface that receives an image from the display.

37. The electronic device defined in claim 36 further comprising:
a display cover layer that overlaps the first and second portions of the coherent fiber bundle.

38. The electronic device defined in claim 33 wherein the optical component comprises a heart rate sensor.

39. A portable electronic device, comprising:
a housing;
a display that is coupled to the housing and that has pixels that display an image;
a lens;
a digital image sensor; and
a field flattener that is interposed between the lens and the digital image sensor and that is formed from a coherent fiber bundle that has an input surface with a curved cross-sectional profile.

40. The portable electronic device defined in claim 39, wherein the input surface comprises a spherical input surface, wherein the pixels surround an area without pixels, wherein light passes through the area, and wherein the lens comprises a ball lens that receives the light.

\* \* \* \* \*